United States Patent
Lin et al.

(10) Patent No.: US 8,663,512 B2
(45) Date of Patent: Mar. 4, 2014

(54) KIT AND METHOD FOR CUSTOMIZATION OF GOLF BALLS

(75) Inventors: Che-Ching Lin, Chiayi (TW); Chen-Tai Liu, Yun-Lin Hsien (TW); Hideyuki Ishii, Portland, OR (US); Chia-Chyi Cheng, Hillsboro, OR (US)

(73) Assignee: NIKE, Inc., Beaverton, OR (US)

( * ) Notice: Subject to any disclaimer, the term of this patent is extended or adjusted under 35 U.S.C. 154(b) by 65 days.

(21) Appl. No.: 12/848,566

(22) Filed: Aug. 2, 2010

(65) Prior Publication Data
US 2012/0024451 A1   Feb. 2, 2012

(51) Int. Cl.
*A63B 45/00*   (2006.01)

(52) U.S. Cl.
USPC .......... 264/36.12; 425/12; 473/361; 473/377; 473/607

(58) Field of Classification Search
USPC ......... 473/280, 281, 370–371, 374, 376, 356, 473/354, 351, 377, 361, 363, 364, 365, 473/378; 264/36.12; 425/116, 12, 395
See application file for complete search history.

(56) References Cited

U.S. PATENT DOCUMENTS

| | | | |
|---|---|---|---|
| 1,533,563 A | | 4/1925 | Sabatino |
| 1,595,409 A | * | 8/1926 | Kerr ................................. 425/12 |
| 2,361,348 A | * | 10/1944 | Dickson et al. ............... 264/278 |
| 2,787,024 A | | 4/1957 | Smith |
| 3,216,058 A | * | 11/1965 | Glaser ............................. 425/11 |
| 4,959,000 A | * | 9/1990 | Giza ............................... 425/116 |
| 5,389,169 A | * | 2/1995 | McRae ............................. 156/98 |
| 5,390,932 A | * | 2/1995 | Russo, Sr. ...................... 473/377 |
| 5,427,377 A | * | 6/1995 | Maruoka ........................ 473/377 |
| 5,558,011 A | * | 9/1996 | Heim ............................... 99/595 |
| 5,569,418 A | * | 10/1996 | Russo, Sr. .................. 264/36.12 |
| 5,976,430 A | * | 11/1999 | Kataoka et al. ............ 264/36.12 |
| 6,130,411 A | | 10/2000 | Rockenfeller et al. |

(Continued)

FOREIGN PATENT DOCUMENTS

| | | |
|---|---|---|
| AT | 387329 | 1/1989 |
| CN | 202219071 U | 5/2012 |

(Continued)

OTHER PUBLICATIONS

European Search Report dated Jan. 4, 2012 in European Patent Application No. EP 11 17 6218.

(Continued)

*Primary Examiner* — Gene Kim
*Assistant Examiner* — John E Simms, Jr.
(74) *Attorney, Agent, or Firm* — Plumsea Law Group, LLC

(57) ABSTRACT

The present disclosure provides to a kit for customizing and recycling golf balls, and related methods. The kit includes one or more sets of golf ball covers, may include one or more sets of golf ball cores, and may further include a golf ball cover removal device and a golf ball cover application device. A golfer may select a golf ball cover from a set based on a desired play characteristic. For example, the golfer may select a relatively hard cover from a set of golf ball covers having different hardness values. The golfer may then apply the selected golf ball cover to a golf ball core using the golf ball cover application device. The core may be selected from a set of cores in the kit, or the core may be obtained from a recycled golf ball using a golf ball cover removal device.

23 Claims, 12 Drawing Sheets

(56) References Cited

U.S. PATENT DOCUMENTS

| | | | |
|---|---|---|---|
| 6,171,091 B1* | 1/2001 | Bettencourt | 425/116 |
| 6,371,870 B1* | 4/2002 | Calabria et al. | 473/370 |
| 6,575,846 B1 | 6/2003 | Boehm et al. | |
| 6,699,027 B2 | 3/2004 | Murphy et al. | |
| 6,776,731 B2 | 8/2004 | Shannon et al. | |
| 2001/0002738 A1* | 6/2001 | Sullivan et al. | 264/279.1 |
| 2001/0024981 A1* | 9/2001 | Binette et al. | 473/374 |
| 2001/0039220 A1* | 11/2001 | Kennedy et al. | 473/378 |
| 2002/0056932 A1* | 5/2002 | Watabe et al. | 264/36.12 |
| 2003/0157998 A1* | 8/2003 | Kennedy et al. | 473/351 |
| 2004/0209707 A1 | 10/2004 | Sullivan et al. | |
| 2008/0081710 A1 | 4/2008 | Chen et al. | |
| 2009/0166924 A1* | 7/2009 | Kuttappa | 264/277 |

FOREIGN PATENT DOCUMENTS

| | | | |
|---|---|---|---|
| EP | 2314360 | 4/2011 | |
| EP | 2415503 | 4/2013 | |
| KR | 10-0538945 * | 12/2005 | A63B 45/00 |
| TW | 273517 | 4/1996 | |
| TW | 201119711 | 2/2011 | |
| WO | 2008042416 | 4/2008 | |

OTHER PUBLICATIONS

Notification of Grant of Patent Right for Utility Model for Chinese Utility Model Patent Application No. 201120277679.0 issued on Jan. 11, 2012.

Communication pursuant to Rule 70(2) & 70a(2) EPC and reference to Rule 39(1) EPC mailed Feb. 13, 2012 for European Patent Application No. 11176218.3.

Response to communication pursuant to Rule 70(2) & 70a(2) EPC and reference to Rule 39(1) EPC filed on Jun. 21, 2012 for European Patent Application No. 11191639.1.

Communication under Rule 71(3) EPC mailed Oct. 12, 2012 for European Patent Application No. 11191639.1.

Office Action for Chinese Invention Patent Application No. 201110219227.1 mailed on Aug. 27, 2013.

* cited by examiner

KIT AND METHOD FOR CUSTOMIZATION OF GOLF BALLS

BACKGROUND

The present disclosure relates generally to a kit for customizing and/or recycling a golf ball, and a method of recycling or customizing the golf ball. In particular, the present disclosure relates to a kit that enables a golfer to select different components of the golf ball based on desired golf ball play characteristics and form a finished golf ball from those components.

The game of golf is an increasingly popular sport at both the amateur and professional levels. A wide range of technologies related to the manufacture and design of golf balls are known in the art. Such technologies have resulted in golf balls with a variety of play characteristics. For example, different golf balls are manufactured and marketed to players having different golfing abilities, such as different swing speeds.

Similarly, a golfer may use different golf balls having different play characteristics depending on the golfer's preferences. For example, different dimple patterns may affect the aerodynamic properties of the golf ball during flight, a difference in the hardness of the cover layer may affect the rate of backspin, or a difference in compression may give the golf ball a different feel.

With regard to hardness in particular, a golfer may choose to use a golf ball having a cover layer that is harder or softer. A golf ball with a harder cover layer will generally achieve reduced driver spin, and achieve greater distances. However, a harder cover layer will generally cause a lower rate of spin, such that the golf ball will be better for drives but more difficult to control on shorter shots. Conversely, a golf ball with a softer cover will generally experience more spin and therefore be easier to control and stop on the green, but will lack distance off the tee.

The term "feel" is often used to describe how hard or soft the golf ball feels on impact, and is directly related to core compression as well as cover hardness. A softer cover and a more compressible core will generally produce a "softer feel." A golf ball having a soft feel will produce a dull sound when struck by a golf club face, and the impact will not resonate through the golf club shaft to an appreciable degree. On the other hand, a golf ball having a hard feel will make a "click" sound when struck by a golf club face, and the impact will translate through the golf club shaft so as to feel solid to the golfer. The term "compression" utilized in the golf ball trade generally refers to the overall deflection that a body undergoes when subjected to a compressive load. For example, PGA compression indicates the amount of change in golf ball's shape upon striking.

A wide range of golf balls having a variety of hardness and compression characteristics are known in the art. Generally, the hardness of a cover layer and the compression of the golf ball are determined by the chemical composition and physical arrangement of the various layers making up the golf ball. Accordingly, a number of different golf ball materials are mixed and matched in various combinations and arrangements to create golf balls having different hardness and compression values.

However, designing golf balls to achieve desired play characteristics suffers from at least several difficulties. Generally, the construction of known golf balls requires that a wide range of design variables such as layer arrangement, materials used in each layer, and layer thickness be balanced against each other. Changes to any of these variables may therefore improve a desired play characteristic only at the expense of other play characteristics.

As a result, a golfer may be required to purchase several sets of golf balls in order to achieve different play characteristics. Namely, a golfer may be required to purchase and use several sets of golf balls in order to achieve different play characteristics that may be desired under, for example, different play conditions. For example, a golfer may wish to use one set of golf balls, have certain play characteristics, on long courses. However, the golfer may wish to use a different set of golf balls, having different play characteristics, on short courses. As another example, a golfer may wish to use different golf balls having different play characteristics under wet or dry weather conditions. The need to purchase, carry and store several sets of golf balls therefore presents an inconvenience and unnecessary expenses to the golfer.

Furthermore, golf ball cover layers are known to wear out and degrade over time due to repeated impacts with a golf club. Although materials used in the cover layer are generally resilient, the cover layer will eventually crack due to the blunt force of being hit by a golf club. The golf ball then exhibits less than optimal play characteristics, and the ball will ultimately become unusable. Amateur golfers generally prefer to minimize the costs of purchasing new golf balls. Although a variety of methods and systems have been developed to repair the surface layer of a golf ball, in practice golfers usually purchase entirely new golf balls when the cover layers are worn. Such practices generally fail to reuse components of the golf ball which continue to be perfectly functional. The practice of purchasing entirely new golf balls therefore creates increased costs to the golfer, as well as an increased environmental impact due to the disposal of waste golf balls.

Accordingly, there is a need in the art for a system and method that addresses the shortcomings of the prior art discussed above.

SUMMARY

In one aspect, the invention provides a kit containing components for customizing and recycling a golf ball, the kit comprising: a set of golf ball cores, including at least two golf ball cores; a set of golf ball covers, including at least two golf ball covers; a golf ball cover removal device; and a golf ball cover application device; wherein the each of the golf ball covers in the set of golf ball covers and each of the golf ball cores in the set of golf ball cores are configured such that a finished golf ball is formed by applying a cover around a core through the use of the golf ball cover application device.

In another aspect, the present disclosure provides a kit containing components for customizing and recycling a golf ball, the kit comprising: a set of golf ball covers, including at least two golf ball covers; wherein the each of the golf ball covers are configured such that a finished golf ball is formed by applying a cover around a golf ball core through the use of a golf ball cover application device.

Finally, the present disclosure also provides a method of customizing a golf ball, the method comprising the steps of: receiving a set of golf ball covers, the set of golf ball covers including at least two golf ball covers; receiving a golf ball core; selecting a golf ball cover out of the set of golf ball covers, the selection of the golf ball cover being based on a desired golf ball play characteristic associated with golf ball cover layers; applying the selected golf ball cover around the golf ball core so as to create a finished golf ball.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Generally, the present disclosure relates to a kit for customizing and recycling golf balls. The kit includes one or more sets of types of golf ball components, such as sets of golf ball covers or sets of golf ball cores. A golfer may select a golf ball component from a set based on a desired play characteristic, for example the golfer may select a relatively hard cover from a set of golf ball covers having different hardness values. The golfer may then apply the selected golf ball cover to a golf ball core using a golf ball cover application device, which may be included in the kit. The core may be selected from a set in the kit, or the core may be obtained from a recycled golf ball using a golf ball cover removal device.

Figure 1:
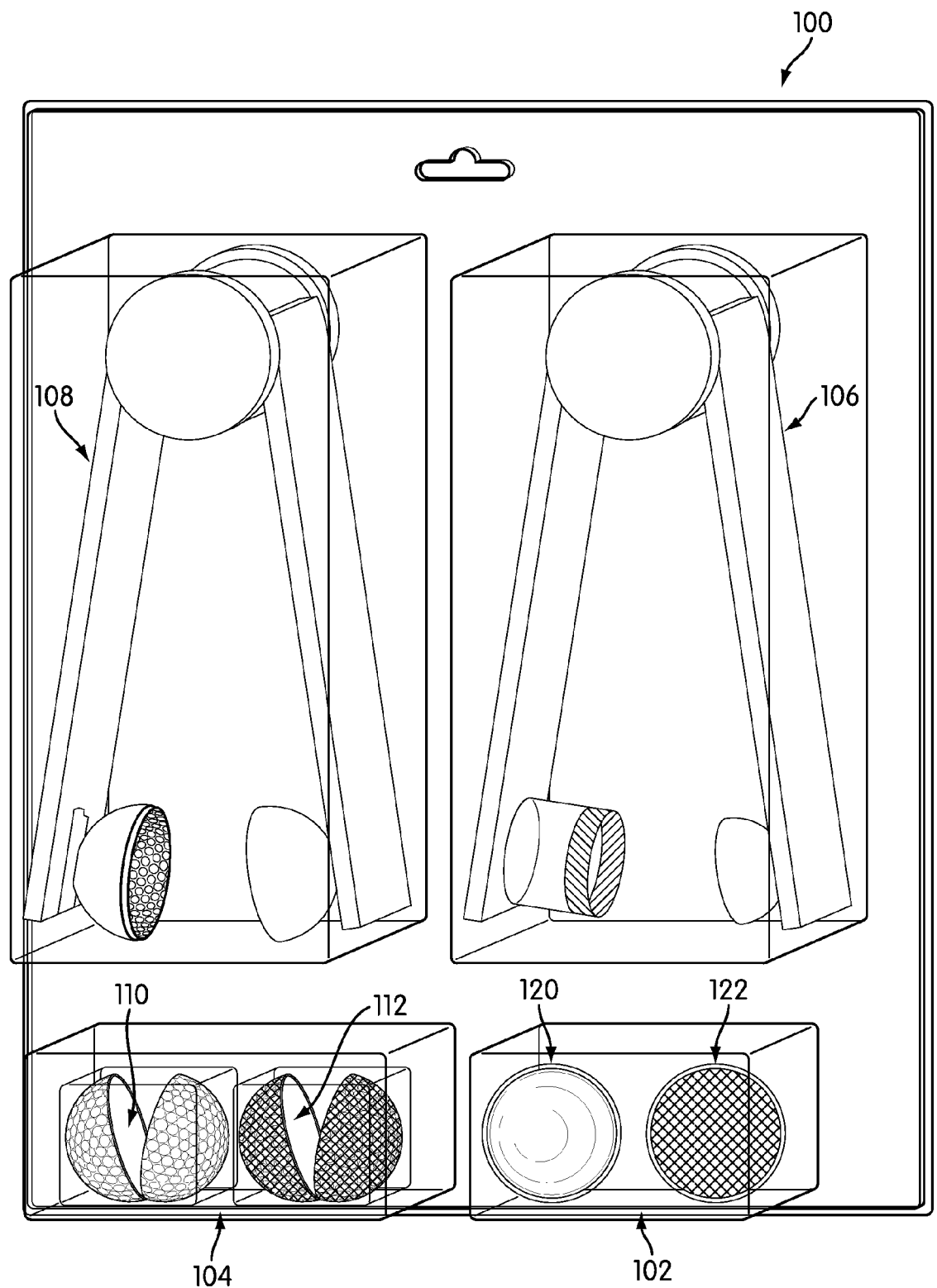
FIG. 1 shows a first exemplary kit, containing a set of two golf ball cores, a set of two golf ball covers, a golf ball cover scraping device; and a golf ball cover heating clamp.

FIG. 1 shows an exemplary kit in accordance with the present disclosure. First, kit 100 includes a set of golf ball cores 102. Set 102 includes first golf ball core 120 and second golf ball core 122. Generally, a set of golf ball cores may include at least two golf ball cores. For example, a set of golf ball cores may includes at least three golf ball cores, at least four golf ball cores, or at least five golf ball cores. A set of golf ball cores may generally include any number of golf ball cores, as may be reasonably packaged together and sold commercially.

First golf ball core 120 may be associated with a first preselected play characteristic value, while second golf ball core 120 may be associated with a second preselected play characteristic value, where the first and the second preselected play characteristic values may be different. The play characteristic may be a compression value.

As used herein, the term "core" refers to the inner structural portion(s) of a golf ball. Although the term core usually refers only to the innermost structural component of a golf ball, as used herein the term "core" may additionally include any intermediate layers that are not the outermost cover layer. For example, core 120 may be used to create a finished golf ball having a two-piece construction, in which case core 120 includes only the center innermost component of the finished golf ball. In other embodiments, core 120 may be used to create a finished golf ball having a three-piece construction, in which case core 120 may include a spherical innermost center and an intermediate layer thereon. Generally, each core may be a wound core or a unitary core, as may be known and used in the art of golf balls.

As used herein, the term "compression" generally refers to the overall deflection that a core undergoes when subjected to a compressive load. For example, "PGA compression" is a measure of the amount of change in a golf ball's shape upon striking. To determine PGA compression using the 0-200 scale, a standard force is applied to the external surface of the golf ball. A ball which exhibits no deflection is rated 200 and a ball which deflects 0.2 inches is rated 0. Every change of 0.001 of an inch in deflection represents a 1 point drop in compression. Consequently, a ball which deflects 0.1 inches (100 times 0.001 inches) has a PGA compression value of 100 (i.e., 200−100 =100) and a ball which deflects 0.110 inches (110 times 0.001 inches) has a PGA compression of 90 (i.e., 200−110=90). Although PGA compression is measure on a finished golf ball, the PGA compression 0-200 scale is used herein to describe the compression values of the cores themselves. Using this scale and terminology, a core having a higher compression value (about 100 or greater) experiences less compression, while a core having a lower compression value (about 80 or less) undergoes more compression.

The compression value of the golf ball may affect the playability of the ball on striking, as well as the sound or "click" produced. Similarly, compression can affect the "feel" of the ball to the golfer. A golfer may feel a hard or a soft responsive feel, as felt in the golfer's hands as a result of the impact force resonating through the golf club shaft. The feel of a golf ball may be particularly important in chipping and putting. Specifically, the degree of compression of a golf ball against the golf club face strongly influences the resultant spin rate. Typically, a core having a higher compression value core will produce a higher spin rate than a core having a lower compression value. This occurs because, when the swing speed and all other components of the golf ball are equal, a core having a higher compression value serves to compress the cover of the golf ball against the face of the golf club at impact to a much greater degree than a core having a lower compression value. The golf ball having a higher compression value core therefore achieves more "grab" of the ball against the clubface, and therefore experiences higher spin rates. In other words, the cover is squeezed between the relatively incompressible core and clubface. In contrast, when a lower compression value core is used, the cover is under much less compressive stress than when a higher compression value core is used. The lower compression value golf ball therefore does not contact the clubface as intimately, which results in lower spin rates.

In practice, tournament quality balls have compression values of about 80 to about 100. Balls having compression values of around 80 are commonly used by golfer having lower swing speeds, such as junior, senior and amateur women golfers. Balls having compression values of about 90 are commonly used by golfers having average swing speeds, such as amateur male golfers and professional female golfers. Balls having compression values of about 100 are commonly used by golfers having high swing speeds, such as professional male golfers. The selection of a particular golf ball compression value depends on the golfer's athletic abilities, as well as the golfer's personal preferences.

Therefore, generally, the cores herein may have any value on the PGA compression scale between 0 and 200. In particular embodiments, the cores herein may having compression values such that they follow USGA rules regarding initial velocity off the tee. In particular embodiments, the cores herein may have compression values of between about 70 and about 110. In other embodiments, the cores herein may have compression values of between about 80 and about 100, or any combination of range endpoints here listed.

Generally, as mentioned above, each core in a set of cores may be associated with a certain preselected play characteristic. In various embodiments, each core in a set of cores may have the same compression value, or different compression values. For example, first golf ball core 120 in set 102 may have a first preselected compression value, and second golf ball core 122 may have a second preselected compression value. First preselected compression value and second preselected compression value may be the same or different. In embodiments where the first preselected compression value and the second preselected compression value are different, the compression values may differ by at least a specific predetermined amount. For example, the first preselected compression value and the second preselected compression value may differ by at least about 20 units, or differ by at least about 10 units, or differ by at least about 5 units, or differ by at least about 3 units. Although set 102 only includes two cores, the relationships among the several cores in any set may follow the same pattern: each core may have a preselected compression value that differs from the compression values of all other cores in the set by at least a specific predetermined amount.

Again with particular respect to set 102, first golf ball core 120 may (for example) have a compression value of about 80, while second golf ball core 122 may have a compression value of about 100. In other embodiments of set 102, first core 120 may have a compression value of about 90, while second core 122 may have a compression value of about 100. In yet other embodiments of set 102, first core 120 may have a compression value of about 87, while second core 122 may have a compression value of about 92.

Each core in a set of cores may be visually marked so as to distinguish each core from the others in the set. For example, in set 102, first core 120 may be lighter in coloration, while second core 122 may be darker in coloration. The coloration of a core may be controlled by adding dyes or pigments to the material making up the core. In other embodiments, each core may be visually marked by having different writing or indicia thereon. The visual marking may allow a golfer to associate the visual appearance of a core with a certain play characteristic possessed by the core. For example, generally, a core having a higher compression value may be darker in color than a core having a lower compression value.

Except as otherwise herein noted, the material used for some or each core may be made from any of various materials known to be used in golf ball manufacturing. For example, each core (or any portion thereof) may be made from a thermoset material, a thermoplastic material or combinations thereof. In some embodiments, the material used in a core may be made from a thermoset material, such as a rubber-like compound. Base rubbers include 1,4-cis-polybutadiene, polyisoprene, styrene-butadiene copolymers, natural rubber, and mixtures thereof. If greater resilience is desired, 1,4-cis-polybutadiene in particular may be used. Furthermore, 1,4-cis-polybutadiene may be used as the base material and mixed with other ingredients. However, the amount of 1,4-cis-polybutadiene should be at least 50 parts by weight, based on 100 parts by weight of the rubber compound.

Additionally, a base rubber material may further include additives, like a cross-linking agent and a filler. For example, the cross-liking agent includes zinc diacrylate, magnesium acrylate, zinc methacrylate, and magnesium methacrylate, wherein zinc diacrylate in particular may be used to achieve greater resilience. Furthermore, in order to achieve a greater specific gravity, the rubber compound can include filler, such as zinc oxide, barium sulfate, calcium carbonate, and magnesium carbonate, wherein zinc oxide is preferable. Powder of metal, like tungsten, having a great specific gravity can also be included to reach the required specific gravity.

The material of some or each part of a core can be made from a thermoplastic material as well, for example, ionomer resin, highly neutralized acid polymer composition, polyamide resin, polyester resin, polyurethane resin, and a mixture thereof.

Kit 100 next includes a set of golf ball covers 104. Set 104 includes first golf ball cover 110 and second golf ball cover 112. Generally, a set of golf ball covers may include at least two golf ball covers. For example, a set of golf ball covers may include at least three golf ball covers, at least four golf ball covers, or at least five golf ball covers. A set of golf ball covers may generally include any number of golf ball covers, as may be reasonably packaged together and sold commercially.

First golf ball cover 110 in set 104 may be associated with a first preselected play characteristic value, while second golf ball cover 112 may be associated with a second preselected play characteristic value, where the first and the second preselected play characteristic values may be different. The play characteristic may be a hardness value.

As used herein, the phrase "golf ball cover" generally refers to any structure which may form the outermost cover layer of a finished golf ball. Cover layers are conventional components of known golf balls. As used in this disclosure, the phrase "cover layer" refers to the outermost structural layer of a finished golf ball, while the phrase "golf ball cover" refers to the structure which may be turned into a cover layer when applied around a golf ball core. Specifically, each golf ball cover and each golf ball core are configured such that a finished golf ball may be formed by applying a cover around a core through the use of the golf ball cover application device (described below).

As shown in FIG. 1, each golf ball cover may be in the form of two hemispheres divided along a plane passing through the center of the sphere. In this embodiment, the division between the hemispheres is even, i.e., divided along the equator of the ball cover, though in other embodiments, the division may be along other latitudinal lines. In other embodiments, each golf ball cover may take other shapes, so long as the cover may be applied around a core through the use of the golf ball cover application device. For example, each cover may be in the shape of two irregular hemispheres, such that the irregularities may align the two hemispheres in accordance with (for example) a dimple pattern. Each cover may have a thickness in accordance with known golf ball cover layer thicknesses, and may comply with various USGA rules regarding size. Specifically, each cover may have a thickness that is slightly greater than a desired cover layer thickness on a finished golf ball in order for excess material to be removed while ensuring a complete seal around the core.

Each golf ball cover in a set of golf ball covers may have a predetermined hardness value. As used herein, the term "hardness" refers to the measure of the depth of an indentation in the material created by a given force on a standardized presser foot. Hardness may be determined in accordance with known industry standards, such as ASTM D2240 for example. All hardness values discussed in this disclosure are given in the Shore D scale.

The hardness value of a cover layer may affect the playability of the golf ball upon striking. Namely, as mentioned above (all other components of the golf ball and swing characteristics being equal), a golf ball with a harder cover layer will generally achieve reduced driver spin, and achieve greater distances. However, a harder cover layer will generally cause a lower rate of spin, such that the golf ball will be better for drives but more difficult to control on shorter shots. This occurs because a harder cover layer transfers more of the kinetic impact energy to the core. Conversely, a golf ball with a softer cover will generally experience more spin and therefore be easier to control and stop on the green, but will lack distance off the tee.

Generally, golf ball cover layers have hardness values of between about 30 and about 80 Shore D. Golf balls having cover layers with hardness values of around 40 or less are commonly used on shorter courses or other courses where control is more important than distance. Golf balls having cover layers with hardness values of around 50 may be used under a variety of conditions, as an all around ball. Golf ball having cover layers with hardness values of around 60 or more may be used on long courses where distance is more important. The selection of a particular golf ball cover layer hardness value may depend on the play conditions, the golfer's athletic ability, and the golfer's personal preferences.

Therefore, generally, the covers disclosed herein may have any hardness value of between about 30 and 80 Shore D. Hardness values of a cover are taken on a finished golf ball including a cover layer formed from a given cover, although this disclosure will discuss the hardness value of a cover per se for ease of description. In embodiments, covers herein may have hardness values of between about 40 and about 70, or between about 45 and 65, or between about 50 and 60, or any combination of range endpoints here listed.

Generally, each cover in a set of golf ball covers may be associated with a certain preselected play characteristic, which may be a hardness value. In various embodiments, each cover in a set of covers may have the same hardness value, or different hardness values. For example, first golf ball cover 110 in set 104 may have a first hardness value, and second golf ball cover 112 may have a second hardness value. First hardness value and second hardness value may be the same or different.

In embodiments where the first hardness value and the second hardness value are different, the hardness values may differ by at least a specific predetermined amount. For example, the first hardness value and the second hardness value differ by at least about 20 units Shore D, or differ by at least about 10 units Shore D, or differ by at least about 5 units Shore D, or differ by at least about 3 units Shore D. Although set 104 includes only two covers, the relationships among the several covers in any set of covers may follow the same pattern: each cover may have a hardness value that differs from the hardness value of all other covers in the set by at least a specific predetermined amount.

Again with respect to set 104, first golf ball cover 110 may (for example) have a hardness value of about 40, while second golf ball cover may have a hardness value of about 60. In other embodiments of set 104, first cover 110 may have a hardness value of about 45, while second cover 122 may have a hardness value of about 55. In yet other embodiments of set 104, first cover 110 may have a hardness value of about 50, while second cover 112 may have a hardness value of about 55.

Each cover in a set of covers may be visually marked so as to distinguish each cover from the other covers in the set. For example, in set 104, first cover 110 may be lighter in coloration, while second cover 112 may be darker in coloration. The coloration of a cover may be controlled by adding dyes or pigments to the material making up the cover. In other embodiments, each cover may be visually marked by having different writing or indicia thereon. The visual marking may allow a golfer to associate the visual appearance of a cover with a certain play characteristic possessed by the cover. For example, generally, a cover having a higher hardness value may be darker in color than a cover having a lower hardness value.

The golf ball covers may also include a plurality of dimples on an outer surface thereof. The plurality of dimples may generally be arranged on the cover in any pattern, as may be known in the art of golf balls. Various known dimple packing patterns are known in the art. The dimples may generally be of any shape, such as circular, triangular, or multi-sided. The dimples may be of uniform shape and size, or the dimple pattern may be made up of two or more different types of dimples having (for example) different sizes or different shapes. Alternatively, a cover ball cover may lack dimples. In such embodiments, dimples may be added to the cover layer during the process of surrounding a core with a cover, as described below.

Except as otherwise herein noted, the material used for some or each cover may be made from any of various materials known to be used in golf ball manufacturing, as discussed above. In particular, thermoplastic materials particularly suitable for easy application around a core through heating, as discussed above. Thermoplastic materials may also be recycled and reprocessed through melting, as discussed below.

Kit 100 also includes a golf ball cover removal device 106. Golf ball cover removal device 106 may generally be any type of handheld device that enables a golfer to remove a golf ball cover layer from a finished golf ball. Particular embodiments of the golf ball cover removal device 106 are discussed below with respect to FIGS. 8-10 and 12.

Finally, kit 100 also includes a golf ball cover application device 108. Golf ball cover application device 108 may generally be any type of handheld device that enables a golfer to apply a golf ball cover around a golf ball core so as to form a finished golf ball. The term "finished golf ball" is understood to mean a golf ball including all structural components necessary for the golf ball to function properly when used to play a round of golf. In embodiments, a finished golf ball may accord with all applicable USGA rules regarding tournament play golf balls. Particular embodiments of the golf ball cover application device are discussed below with respect to FIGS. 6 and 7.

Figure 2:
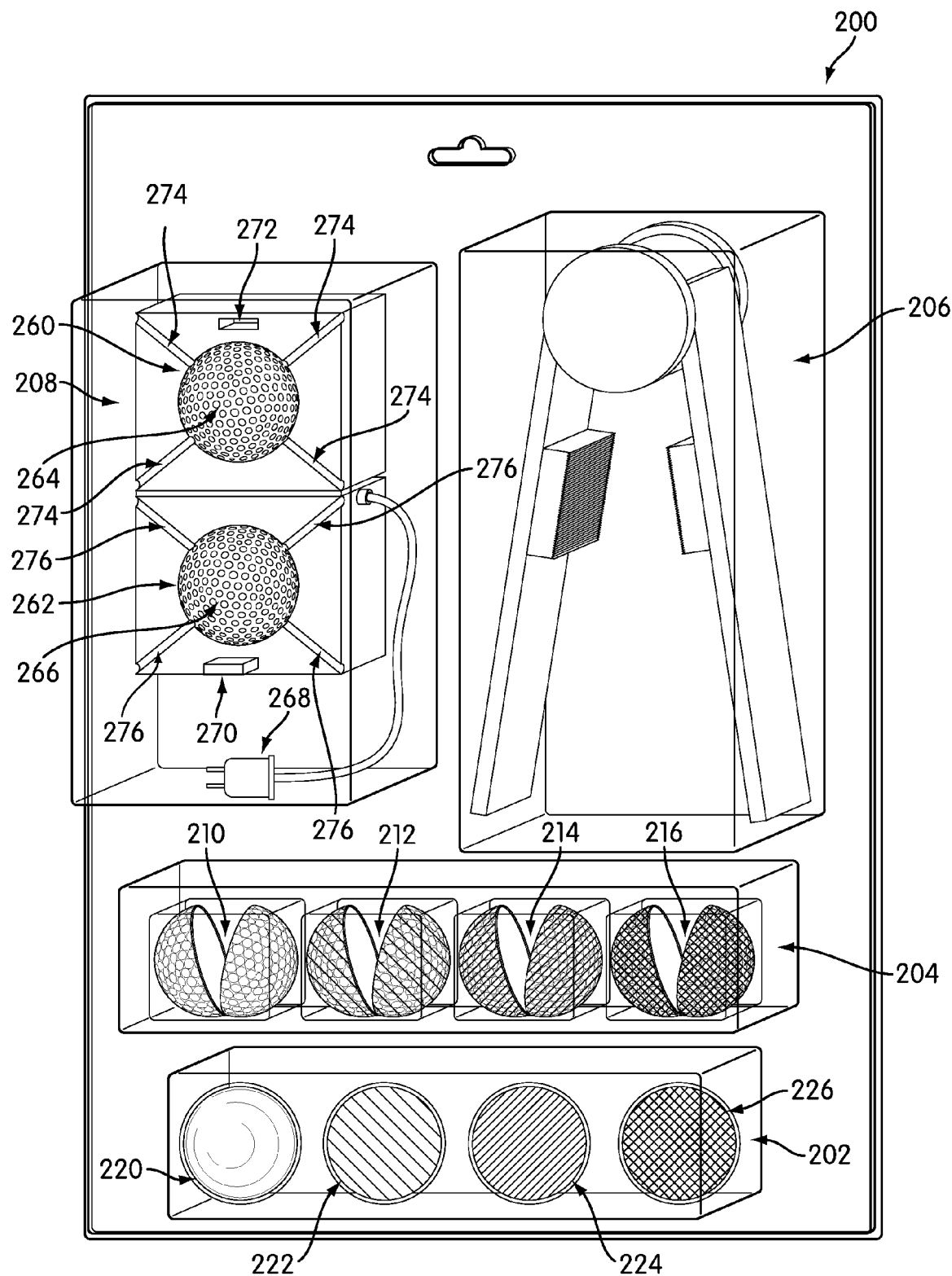
FIG. 2 shows a second exemplary kit, containing a set of four golf ball cores, a set of four golf ball covers, a golf ball cracking device, and a golf ball portable heating mold.

FIG. 2 shows a second exemplary kit 200 in accordance with the present disclosure. First, kit 200 includes a set of golf ball cores 202. Set 202 includes four cores: first core 220, second core 222, third core 224, and fourth core 226. As was discussed with respect to set 102 of cores in kit 100, the cores in set 202 may have the same or various preselected play characteristics. Specifically, in some embodiments, each of first core 220, second core 222, third core 224 and fourth core 226 may have the same compression value. Alternatively, in other embodiments, first core 220 may have a first preselected compression value, second core 222 may have a second preselected compression value, third core 224 may have a third preselected compression value, and fourth core 226 may have a fourth preselected compression value. Each of the first, second, third and fourth preselected compression values may be different. Specifically, each of first through fourth preselected compression values may differ by a specific amount, as discussed above. In one particular embodiment, the first preselected compression value may be about 70, the second preselected compression value may be about 80, the third preselected compression value may be about 90, and the fourth preselected compression value may be about 100.

Next, kit 200 includes a set of golf ball covers 204. Set 204 includes four covers: first cover 210, second cover 212, third cover 214, and fourth cover 216. As was discussed with respect to set 104 of covers in kit 100, the covers in set 204 may have the same or various preselected play characteristics. Specifically, in some embodiments, each of first cover 210, second cover 212, third cover 214 and fourth cover 216 may have the same hardness value. Alternatively, in other embodiments, first cover 210 may have a first preselected hardness value, second cover 212 may have a second preselected hardness value, third cover 214 may have a third preselected hardness value, and fourth cover 216 may have a fourth preselected hardness value. Each of the first, second, third and fourth preselected hardness values may be different. Specifically, each of first through fourth preselected hardness values may differ by a specific amount, as discussed above. In one particular embodiment, the first preselected hardness value may be about 40 Shore D, the second preselected hardness value may be about 50 Shore D, the third preselected hardness value may be about 60 Shore D, and the fourth preselected hardness value may be about 70 Shore D.

Kit 200 further includes a golf ball cover removal device 206. Golf ball cover removal device 206 may be configured to removal a golf ball cover layer from a finished golf ball by applying compressive pressure to the golf ball. Golf ball cover removal device 206 is discussed below and shown in further detail in FIG. 11.

Kit 200 also includes a golf ball cover application device 208. Golf ball cover application device 208 may generally be a heating device. In the particular embodiment shown in FIG. 2, golf ball cover application device 208 is a heating mold. The heating mold 208 is configured to seal a golf ball cover around a golf ball core so as to produce a finished golf ball, by heating the cover such that the cover material reflows and seals itself around a core. Heating mold 208 includes a first cavity 260 and a second cavity 262. First cavity 260 and second cavity 262 are configured to each contain a respective hemispherical half of a cover. First cavity 260 includes first reverse dimple pattern 264 on the internal surface thereof, and second cavity 262 includes second reverse dimple pattern 266 on the internal surface thereof. First reverse dimple pattern 264 and second reverse dimple pattern 266 are made up of a series of bumps, such that the bumps emboss a dimple pattern into a cover layer formed on a golf ball inside first cavity 260 and second cavity 262. As discussed above, the dimple pattern may generally be any dimple pattern known in the art. Heating mold 208 also includes features that allow excess material to drain from first cavity 260 and second cavity 262. Specifically, heating mold 208 may include drainage channels 274 from first cavity 260, and drainage channels 276 from second cavity 262. Material from a cover layer may be pressed by the cavity, such that excess material is extruded out into drainage channels 274 and 276.

Heating mold 208 further includes an electric plug 268, which may be any type of plug able to serve as a conduit for electricity. Finally, heating mold 208 may include a first latch portion 270 and a second latch portion 272. First latch portion 270 and second latch portion 272 may allow for first cavity 260 and second cavity 262 to be reversibly secured relative to each other, so as to ensure proper heating and sealing of a cover around a core.

Figure 3:
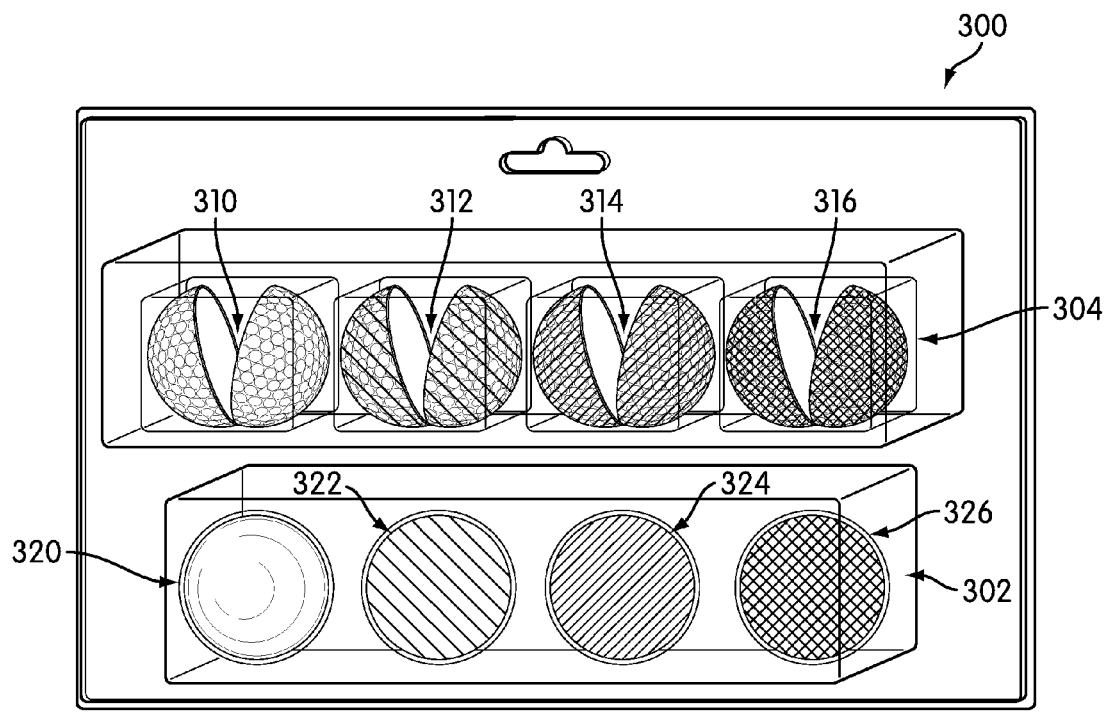
FIG. 3 shows a third exemplary kit, containing a set of four golf ball covers each having a different hardness value and a set of four golf ball cores each having a different compression value.

FIG. 3 shows a third kit 300. Third kit 300 includes a set of golf ball cores 302. Set 302 includes four cores: first core 320, second core 322, third core 324, and fourth core 326. As was discussed with respect to set 202 of cores in kit 200, each of the cores in set 302 may have the same or different preselected play characteristics. Specifically, in some embodiments, each of first core 320, second core 322, third core 324 and fourth core 326 may have the same compression value. Alternatively, in other embodiments, first core 320 may have a first preselected compression value, second core 322 may have a second preselected compression value, third core 324 may have a third preselected compression value, and fourth core 326 may have a fourth preselected compression value. Each of the first, second, third and fourth preselected compression values may be different compression values, or any subset thereof may be different compression values while others may be the same compression value. Specifically, in certain embodiments, each of first through fourth preselected compression values may differ by a specific amount, as discussed above. In one particular embodiment, the first preselected compression value may be about 70, the second preselected compression value may be about 80, the third preselected compression value may be about 90, and the fourth preselected compression value may be about 100. In other embodiments, for example, the first preselected compression value may be about 80, the second preselected compression value may be about 80, the third preselected compression value may be about 100, and the fourth preselected compression value may be about 100.

Kit 300 also includes a set of golf ball covers 304. Set 304 includes four covers: first cover 310, second cover 312, third cover 314, and fourth cover 316. As was discussed with respect to set 204 of covers in kit 200, the covers in set 304 may have the same or different play preselected characteristics. Specifically, in some embodiments, each of first cover 310, second cover 312, third cover 314 and fourth cover 316 may have the same hardness value. Alternatively, in other embodiments, first cover 310 may have a first preselected hardness value, second cover 312 may have a second preselected hardness value, third cover 314 may have a third preselected hardness value, and fourth cover 316 may have a fourth preselected hardness value. Each of the first, second, third and fourth preselected hardness values may be different hardness values, or any subset thereof may be different hardness values while others may be the same hardness value. Specifically, each of first through fourth preselected hardness values may differ by a specific amount, as discussed above. In one particular embodiment, the first preselected hardness value may be about 40 Shore D, the second preselected hardness value may be about 50 Shore D, the third preselected hardness value may be about 60 Shore D, and the fourth preselected hardness value may be about 70 Shore D. In other embodiments, for example, the first preselected hardness value may be about 40, the second preselected hardness value may be about 40, the third preselected hardness value may be about 60, and the fourth preselected hardness value may be about 60.

Kit 300 may be described as a "resupply" kit, as it includes golf ball components without necessarily including any of the devices included with kit 100 or kit 200. Specifically, a golfer may purchase a kit such as kit 100 or kit 200 once, in order to obtain the covers, cores, and devices therein. However, after the cores and covers included with kit 100 or kit 200 have worn due to repeated use, the devices will likely still be useable. Therefore, a golfer is likely to desire additional cores or covers in order to customize further golf balls or recycle still useable components from previously obtained golf balls.

Figure 4:
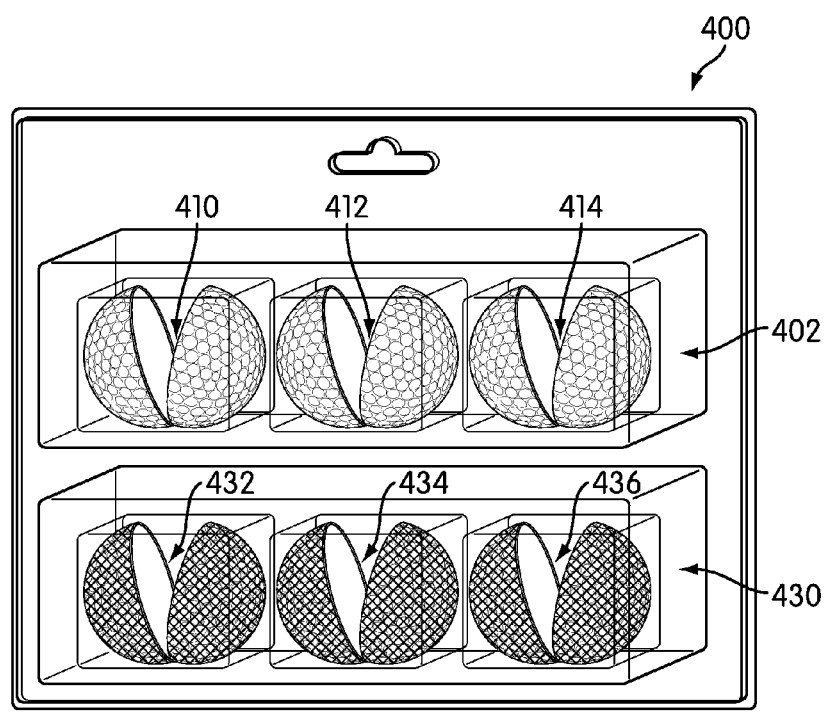
FIG. 4 shows a fourth exemplary kit, containing a first set of three golf ball covers and a second set of three golf ball covers.

FIG. 4 shows another embodiment of a resupply kit 400. Kit 400 includes a first set of golf ball covers 402. First set of golf ball covers 402 includes three covers: first cover 410, second cover 412, and third cover 414. As discussed above with respect to any of the covers disclosed herein, each of the covers in set 402 are configured such that a finished golf ball may be formed by applying a cover around a golf ball core through the use of a golf ball cover application device. Kit 400 further includes a second set of golf ball covers 430. Set 430 also includes three covers: first cover 432, second cover 434, and third cover 436.

Each of the covers in set 402 or set 430 may have the same or different preselected play characteristics. In embodiments, each cover in set 402 may have the same preselected hardness value, or different preselected hardness values. Each cover in set 430 may have the same hardness value as each other, which may be the same as the hardness value of one or more of the covers in set 402, or different hardness values from each other. In embodiments where each cover in set 430 has a different hardness value from each other, one or more of these hardness values may nonetheless be the same as a hardness value of a cover in set 402. In a particular embodiment, as indicated in FIG. 4, each cover in set 402 has a first preselected hardness value, each cover in set 430 has a second preselected hardness value, and the second preselected hardness value is different from the first preselected hardness value.

Figure 5:
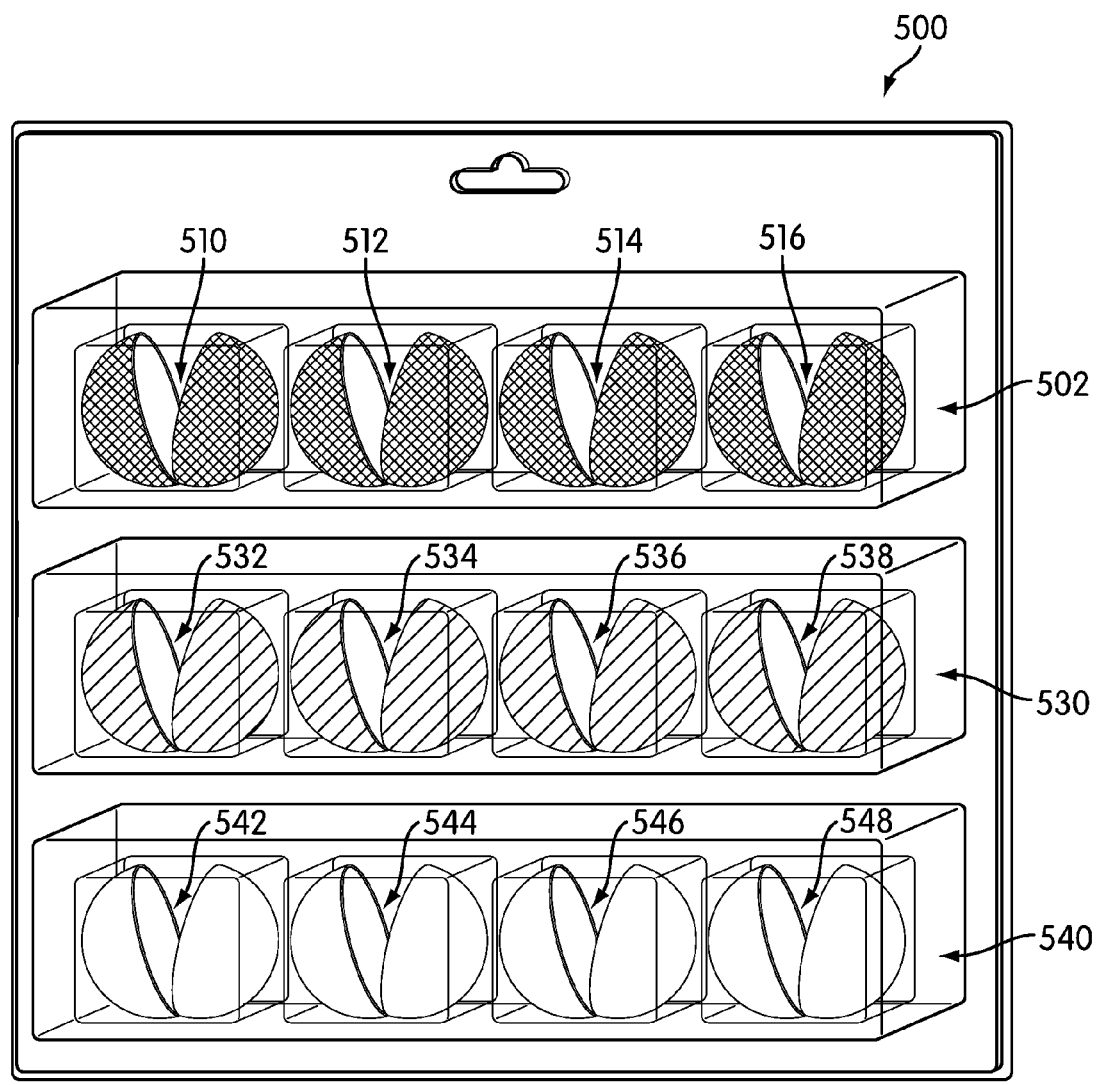
FIG. 5 shows a fifth exemplary kit, containing a first set of three golf ball covers lacking dimples, a second set of three golf ball covers lacking dimples, and a third set of three golf ball covers lacking dimples.

FIG. 5 shows yet another embodiment of a resupply kit 500. Kit 500 includes a first set of covers 502, a second set of covers 530, and a third set of covers 540. Each of set 502, set 530 and set 540 includes four covers. Specifically, first set 502 includes first cover 510, second cover 512, third cover 514, and fourth cover 516. Similarly, second set 530 includes first cover 532, second cover 534, third cover 536, and fourth cover 538. Third set 540 includes first cover 542, second cover 544, third cover 546, and fourth cover 548.

Each cover in each set in kit 500 may have a respective preselected play characteristics. The play characteristic may be a hardness value. In various embodiments, each preselected hardness value may display a relationship to the other preselected hardness values in a respective set or may display a relationship to other preselected hardness values in any set of covers in kit 500. For example, each cover in each set may have an identical single preselected hardness value; or each cover may have a preselected hardness value that is the same as the hardness value of the other covers in a respective set, but different from the hardness values of the covers in the other sets; or each cover may have a preselected hardness value that is different from the hardness values of the other covers in a respective set, but each set includes the same series of hardness values; or each cover may have a unique hardness value that differs from any hardness value in any set; or any combination of the above relationships.

In a particular embodiment, as indicated in FIG. 5, each cover in set 502 has a first preselected hardness value, each cover in set 530 has a second preselected hardness value, and each cover in set 540 has a third preselected hardness value. The first preselected hardness value, the second preselected hardness value, and the third preselected hardness value may all be different from each other. In some embodiments, the first preselected hardness value, the second preselected hardness value, and the third preselected hardness value may differ from each other by a certain specific amount. For example, the first preselected hardness value, the second preselected hardness value, and the third preselected hardness value may differ from each other by about 20 units Shore, or about 10 units Shore D, or about 5 units Shore D, or about 3 units Shore D.

Each of kit 400 and kit 500 may also further include a set of one or more cores. A set of cores included with kit 400 or kit 500 may generally be in accordance with set of cores 102, set of cores 202, or set of cores 302, as discussed above. However, in other embodiments (as shown), resupply kits such as kit 400 and kit 500 may not include any sets of cores. In such embodiments, the covers included in such kits may be applied to a golf ball core recovered from a used golf ball. Generally, covers wear out faster than cores, and so a consumer may reduce costs by replacing only the covers and reusing the cores from their used golf balls.

Each of kit 100, kit 200, kit 300, kit 400 and kit 500 includes at least one set of golf ball covers. Any disclosure with respect to a specific kit regarding the nature of a set of golf ball covers therein may be equally applicable to a set of golf ball covers in any other kit. For example, any set of golf ball covers in any kit may include any number of golf ball covers. Generally, each set of golf ball covers includes at least two covers. In embodiments, as shown or in embodiments not shown, each set of golf ball covers may include at least three covers, or at least four covers, at least five covers, or any number of covers as may reasonable be packaged together and sold commercially to golfers. Similarly, any of the sets of covers in any kit may have any of the relationships among the hardness values as have been discussed. To the extent that any kit may include a set of cores, any disclosure herein with respect to a particular set of cores is similarly applicable to any set of cores in any kit.

Figure 6:
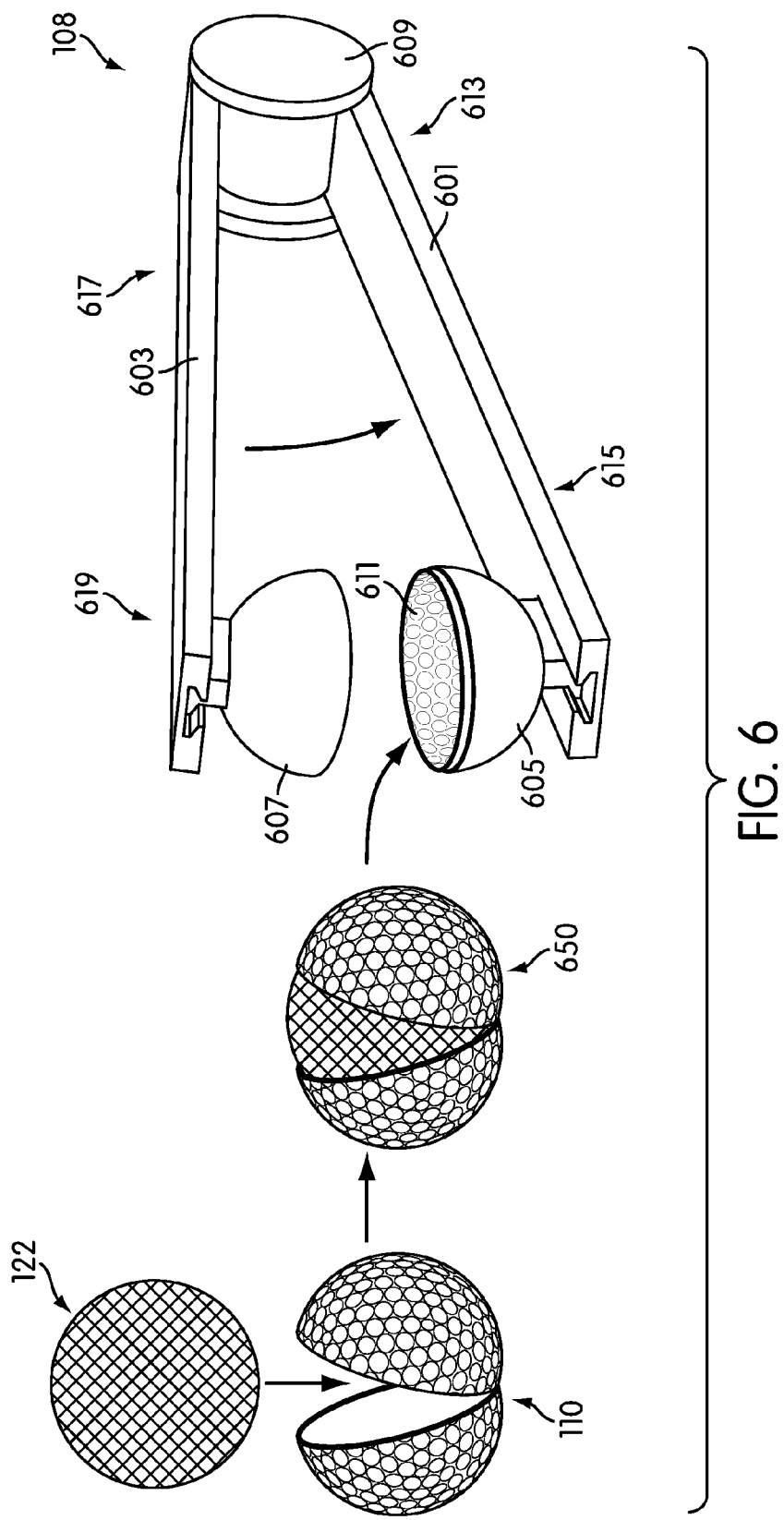
FIG. 6 shows an exemplary golf ball cover heating clamp, with a pre-formed golf ball comprising a golf ball cover disposed around a golf ball core.

FIG. 6 shows an embodiment of a process of applying a cover around a core using a golf ball cover application device. FIG. 6 is particularly shown using components of kit 100 from FIG. 1. After purchasing kit 100, a golfer may create a finished golf ball using the components from kit 100. First, a golfer may select a particular golf ball cover 110 from the set of covers 104. The selection of a particular cover may be based on a desired play characteristic, such as a desired cover layer hardness. For example, a golfer may select a softer cover in order to achieve better control with a golf ball formed therefrom. The golfer may then select a particular golf ball core 122 from the set of cores 102. The selection of a particular core may be based on a desired play characteristic, such as a desired core compression value. For example, a golfer may select a core having a higher compression value in order to achieve increased spin rates. After this selection, core 122 may be placed inside cover 110 in order to form pre-golf ball structure 650. Core 122 may be placed inside cover 110 by the golfer's hands, or by other means.

Pre-golf ball structure 650 may then be acted upon by a golf ball cover application device 108 so as to form a finished golf ball. In the particular embodiment shown, golf ball cover application device 108 is a handheld heating clamp. Handheld heating clamp 108 is fully described in U.S. Pat. No. 8,283,603, originally filed as U.S. patent application Ser. No. 12/604,830, entitled Device for Heating a Golf Ball, and filed on Oct. 23, 2009 (hereinafter "the '830 application"), the disclosure of which is hereby incorporated in its entirety.

Specifically, handheld heating clamp 108 includes a first lever arm 601 and a second lever arm 603. First lever arm 601 includes a first proximal end 613 and a first distal end 615, while second lever arm 603 similarly includes second proximal end 617 and second distal end 619. First lever arm 601 and second lever arm 603 are associated with a pivot 609 at first proximal end 613 and second proximal end 617 respectively. First lever arm 601 further includes a first golf ball receiving unit 605 associated with first distal end 615, first golf ball receiving unit 605 including a first internal heating surface 611. Similarly, second lever arm 603 includes a second golf ball receiving unit 607 associated with second distal end 619, second golf ball receiving unit 607 including a second internal heating surface (not pictured). First golf ball receiving unit 605 and second golf ball receiving unit 607 are aligned within first lever arm 601 and second lever arm 603 (respectively) in such a manner that first golf ball receiving unit 605 and second golf ball receiving unit 607 will completely close around a golf ball component placed therein. Specifically, for example, first golf ball receiving unit 605 and second golf ball receiving unit 607 may be aligned by a fixed attachment mechanism. Alternatively, for example, one or both of first golf ball receiving unit 605 and second golf ball receiving unit 607 may be attached to the respective clamp arms by a flexible attachment mechanism. In either case, the golf ball receiving units are configured to form a seal around the golf ball components therein.

Figure 7:
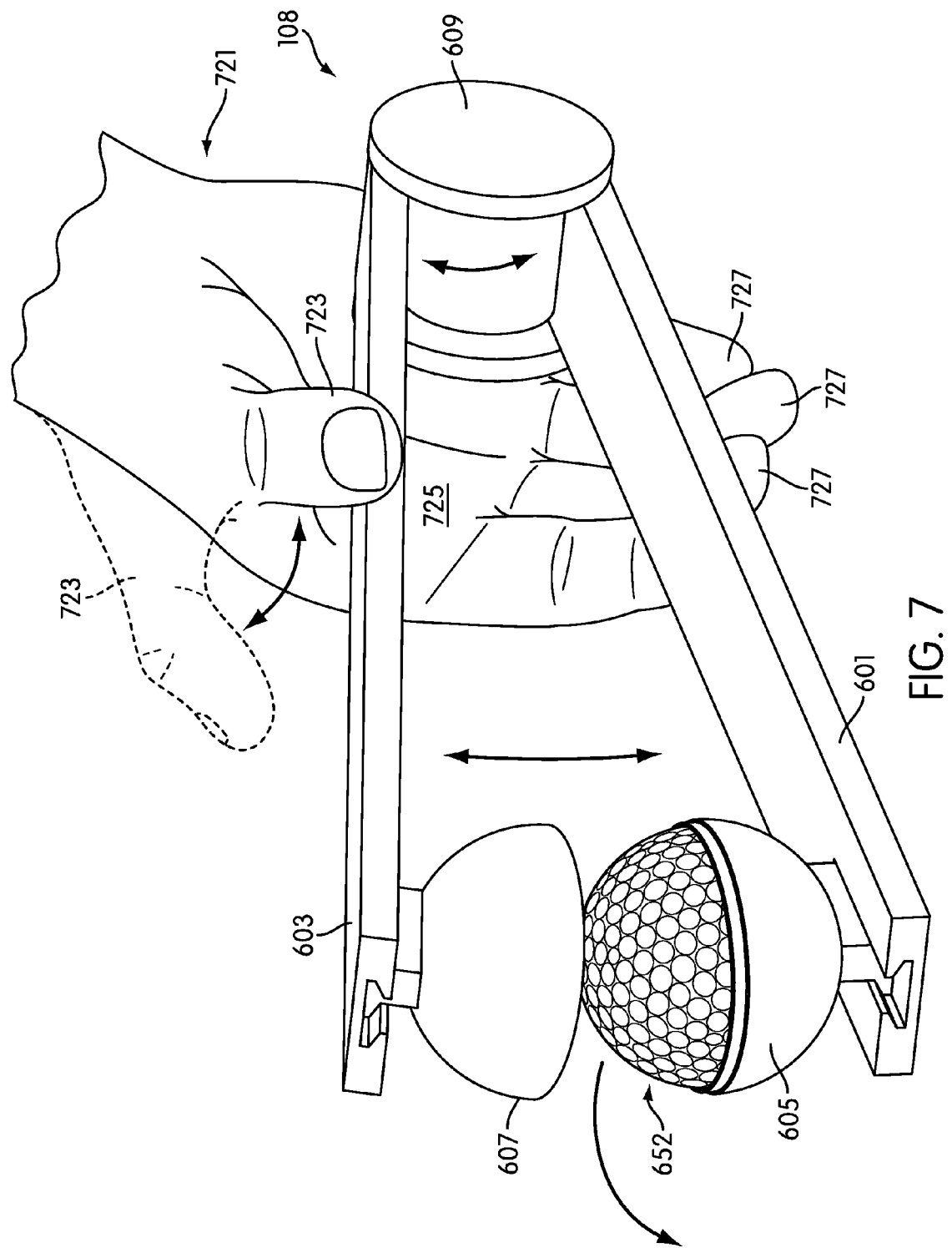
FIG. 7 shows the golf ball cover heating clamp of FIG. 6 after forming a finished golf ball therein.

FIGS. 6 and 7 show how handheld heating clamp 108 may be used to create a finished golf ball. Pre-golf ball structure 650 may first be placed into one of first golf ball receiving unit 605 or second golf ball receiving unit 607. Next, a golfer's hand 721 as shown in FIG. 7 may apply force through the fingers 727 and thumb 723 so as to cause first lever arm 601 and second lever arm 603 to move about pivot 609 such that first golf ball receiving unit 605 and second golf ball receiving unit 607 come into intimate contact. First internal heating surface 611 and the second internal heating surface may then be activated, as described in the '830 application. The heating action causes cover 110 to seal itself around core 122.

Specifically, the heating action may cause cover 110 to seal itself around core 122 in any of several physio-chemical ways. For example, in some embodiments cover 110 may include a heat activated adhesive. In other embodiments, cover 110 may be made of a thermoplastic polymer material. As is generally known in the polymer arts, a thermoplastic polymer is one which undergoes a phase change to a liquid from a solid upon heating above its melting temperature. Thermoplastic polymer materials such as thermoplastic ionomers (such as Surlyn®) or thermoplastic polyurethane (TPU) are commonly used to form golf ball cover layers. In such embodiments, handheld heating clamp 108 may be configured to subject pre-golf ball structure 650 to a temperature in excess of the thermoplastic's melting temperature.

After subjecting pre-golf ball structure 650 to sufficient heating, finished golf ball 652 may be formed. Finished golf ball 652 may then be removed from handheld heating clamp 108 and allowed to cool to approximately room temperature, after which finished golf ball 652 may be used to play golf.

Accordingly, a golfer may use a golf ball cover application device to create a customized golf ball that he or she personally assembles according to desired play characteristics from golf ball components in a kit. In other words, a golfer may perform a method of customizing a golf ball, where the method generally comprises first receiving a set of golf ball covers (such as by purchasing a kit), where the set of golf ball covers including at least two golf ball covers. The golfer also receives a golf ball core. The golfer next selects a golf ball cover out of the set of golf ball covers, the selection of the golf ball cover being based on a desired golf ball play characteristic associated with golf ball cover layers. Finally, the golfer applies the selected golf ball cover around the golf ball core so as to create a finished golf ball.

In certain embodiments of this method, as discussed above, the golfer may receive at least one golf ball core by purchasing a kit that includes said core. In such embodiments of the method, the golfer may receiving a set of golf ball cores, the set of golf ball cores may include at least two golf ball cores. At least two golf ball cores in the set of golf ball cores may have different compression values, and the golfer may select a golf ball core out of the set of golf ball cores based on a desired golf ball core compression value. Such methods that include receiving a core from a kit containing a set of cores are discussed above with respect to kit 100 as shown in FIG. 1, kit 200 as shown in FIG. 2, and kit 300 as shown in FIG. 3.

Alternatively, a golfer may receive a golf ball core by recycling an existing finished golf ball. Generally, a golfer may receive a finished golf ball, the finished golf ball comprising a cover layer substantially surrounding a core. The golfer may then remove the cover layer from the finished golf ball, so as to extract the core from within the finished golf ball. The golfer may then use the extracted core in the method as described above.

Figure 8:
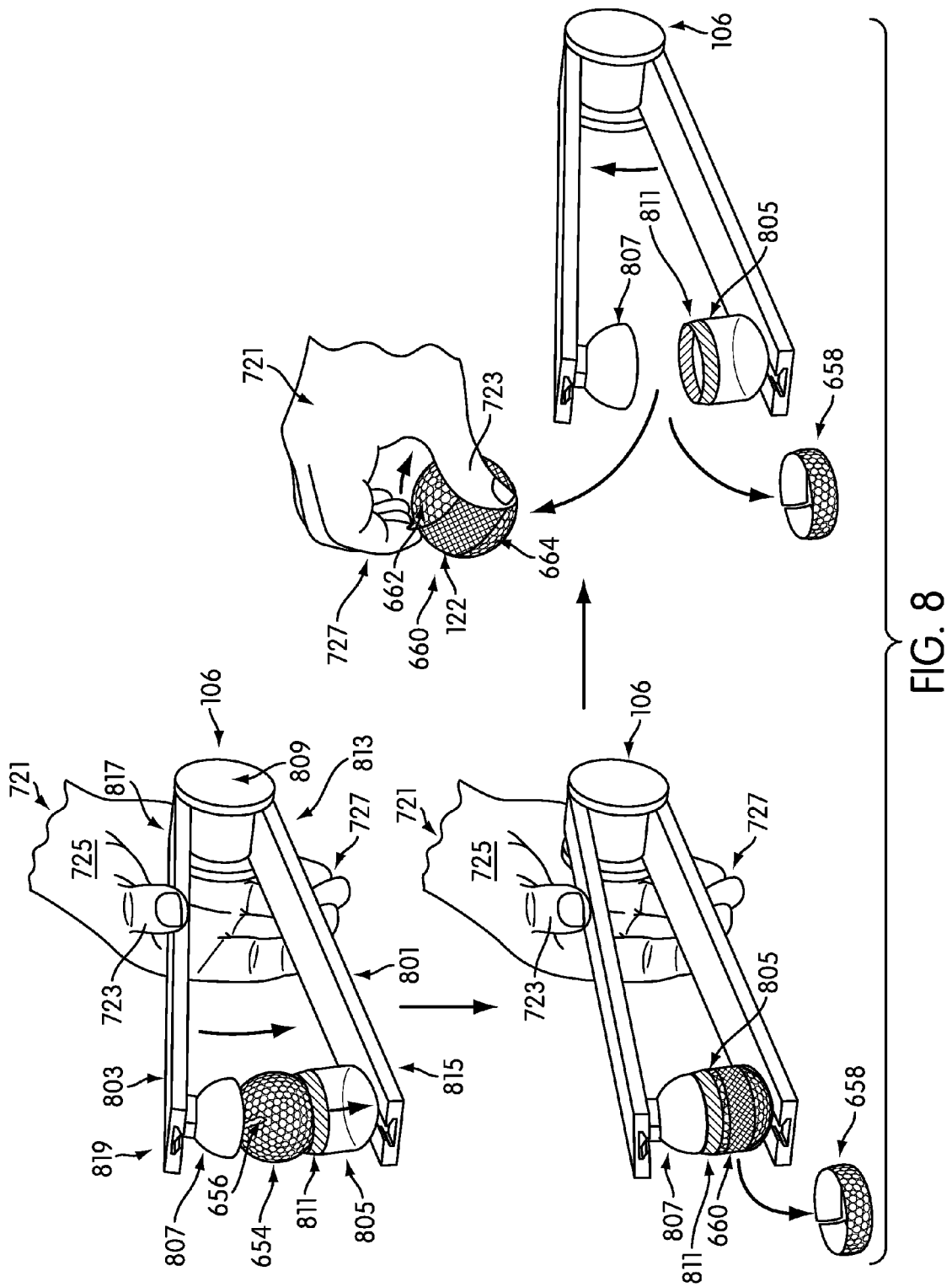
FIG. 8 shows a golf ball cover scraping device as the device is used to remove a golf ball cover layer from a worn golf ball.

FIG. 8 shows one such method of reclaiming a used golf ball core by recycling an existing finished golf ball, and a device used in the method. As was discussed, kit 100 and kit 200 may include a golf ball cover removal device. Golf ball cover removal device 106, as shown in FIG. 8, is one embodiment of such a device. Golf ball cover removal device 106 may also be referred to as a golf ball pitter.

Golf ball pitter 106 comprises a first lever arm 801 and a second lever arm 803. First lever arm 801 is attached at a proximal end 813 thereof to a pivot 809, just as second lever arm 803 is also attached at a proximal end 817 thereof to the pivot 809. First lever arm 801 includes a perimeter cutting edge 811 at a distal end 815 opposite the proximal end 813. Second lever arm 803 includes a golf ball positioning portion 807 at a distal end 819. As discussed with respect to heating clamp 108, first lever arm 801 and second lever arm 803 of golf ball pitter 106 may be movable about pivot 809 by the action of human hand 725. In the embodiment as shown in FIG. 8, perimeter cutting edge 811 and golf ball positioning portion 807 may be aligned so as to move toward and away from each other as first lever arm 801 and second lever arm 803 move about pivot 809. Perimeter cutting edge 811 is configured to cut a golf ball cover around a perimeter of a golf ball 654.

As shown in FIG. 8, finished golf ball 654 may be worn beyond use, as evidenced by crack 656. Finished golf ball 654 may therefore be placed between perimeter cutting edge 811 and golf ball positioning portion 807 within golf ball pitter 106. The golfer then applies force to first lever arm 801 and second lever arm 803 such that the lever arms rotate about pivot 809, and golf ball positioning portion 807 pushes finished golf ball 654 into perimeter cutting edge 811. Perimeter cutting edge 811 therefore physically cuts a portion 658 of the cover layer off of golf ball 654, forming scrapped golf ball 660. The cutting process may also generally be described as a scraping, grating or scouring process.

In some embodiments, the cutting process may take advantage of crack 656 in golf ball 654 to reduce the pressure necessary to achieve cutting. Namely, any cracks or worn portions of the cover layer on finished golf ball 656 may be aligned with perimeter cutting edge 811 to ensure that cover layer portion 658 is easily removed. In other embodiments, a cover layer on finished golf ball 654 may include a designed weakness, which enables the cover layer to be more easily removed from the finished golf ball than would be possible in the absence of such a designed weakness. A designed weakness may take the form of, for example, a particularly thin portion of the cover layer, or a difference in material along a portion of the cover layer. Any of the covers in any of the kits disclosed herein may include such a designed weakness.

After the cutting process, scrapped golf ball 660 may be removed from golf ball holding portion 805 of golf ball pitter 106. As a result of the perimeter removal of cover layer portion 658, scrapped golf ball 660 may include a first cover layer remaining portion 662 and a second cover layer remaining portion 664. In certain embodiments, each of these portions may be removed from core 122 by a golfer's hands 721. In other embodiments, such as when an adhesive may be used to secure the cover layer to the core, remaining portions of the cover layer may be removed by (for example) repeating the cutting step using golf ball pitter 106 with the scrapped golf ball 660 being aligned differently with respect to the perimeter cutting edge 811.

Figure 9:
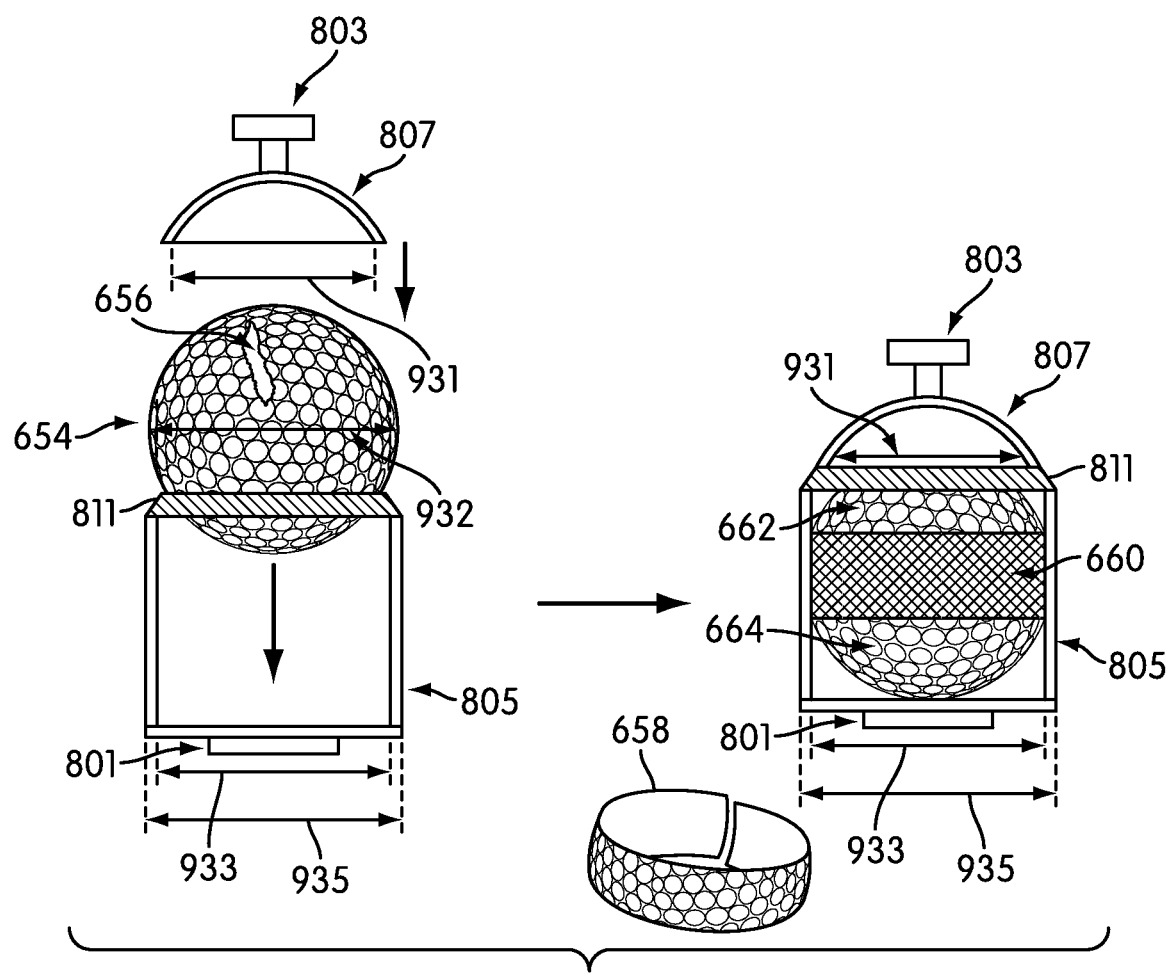
FIG. 9 shows the golf ball cover scraping device of FIG. 8 in further detail.

FIG. 9 shows the cutting process in further detail. In particular, golf ball 654 includes a diameter 932, and perimeter cutting edge 811 includes an internal diameter 933. Golf ball holding portion 805 also includes an external diameter 935. Generally, golf ball diameter 932 may have a value that is between perimeter cutting edge internal diameter 933 and golf ball holding portion external diameter 935. Specifically, golf ball diameter 932 may be less than perimeter cutting edge internal diameter 933 in order to ensure that perimeter cutting edge 811 cuts away portion 658 of the cover layer as golf ball positioning portion 807 pushes finished golf ball 654 down into perimeter cutting edge 811. Golf ball positioning portion 807 also includes an internal diameter 931, which may be the same as perimeter cutting edge internal diameter 933 in order for the golf ball positioning portion 807 to fully engage perimeter cutting edge 811.

Figure 10:
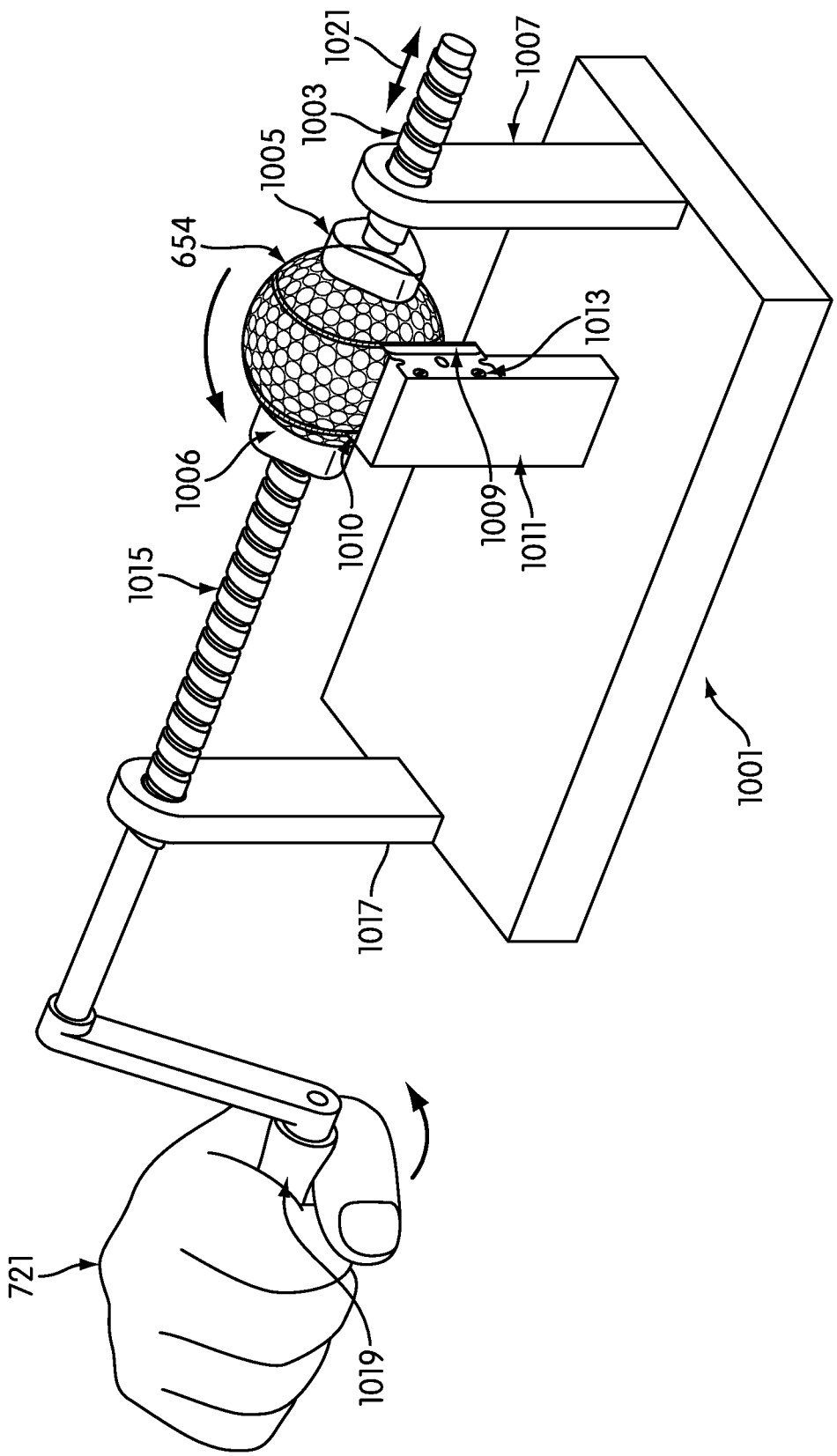
FIG. 10 shows a second embodiment of a golf ball cover scraping device, as the device is used to remove a golf ball cover layer from a worn golf ball.

FIG. 10 shows an alternative embodiment of a golf ball cover removal device. Golf ball cover removal device 1001 includes a first clamp arm 1005, and a second clamp arm 1015. First clamp arm 1005 includes a first golf ball positioning portion 1005 at one end thereof, and is configured so as to be rotatable about its longitudinal axis 1021. Second clamp arm 1015 includes a crank 1019 at one end thereof and a second golf ball positioning portion 1006 at a second end. Crank 1019 may be rotatable by the action of a human hand 721, such that rotation of crank 1019 causes second clamp arm 1015 to rotate about a longitudinal axis 1021.

Golf ball cover removal device 1001 further includes a first cutting edge 1009 and a second cutting edge 1010. First cutting edge 1009 and second cutting edge 1010 may be fixedly aligned with respect to first clamp arm 1003 and second clamp arm 1015 such that rotation of first clamp arm 1003 and second clamp arm 1015 causes golf ball 654, disposed between first golf ball positioning portion 1005 and second golf ball positioning portion 1006, to scrape against first cutting edge 1009 and second cutting edge 1010 so as to remove a portion of cover layer from golf ball 654. As shown in FIG. 10, first clamp arm 1005 may be held in place by first clamp arm support structure 1007, while second clamp arm 1015 may be similarly held in place by second clamp arm support structure 1017. First cutting edge 1009 and second cutting edge 1010 may be held in place by removable attachment mechanisms 1013 to cutting edge support structure 1011. A golfer may therefore use golf ball cover removal device 1001 to scrape away a portion of the cover layer on golf ball 654, so as to recycle a core from golf ball 654.

Figure 11:
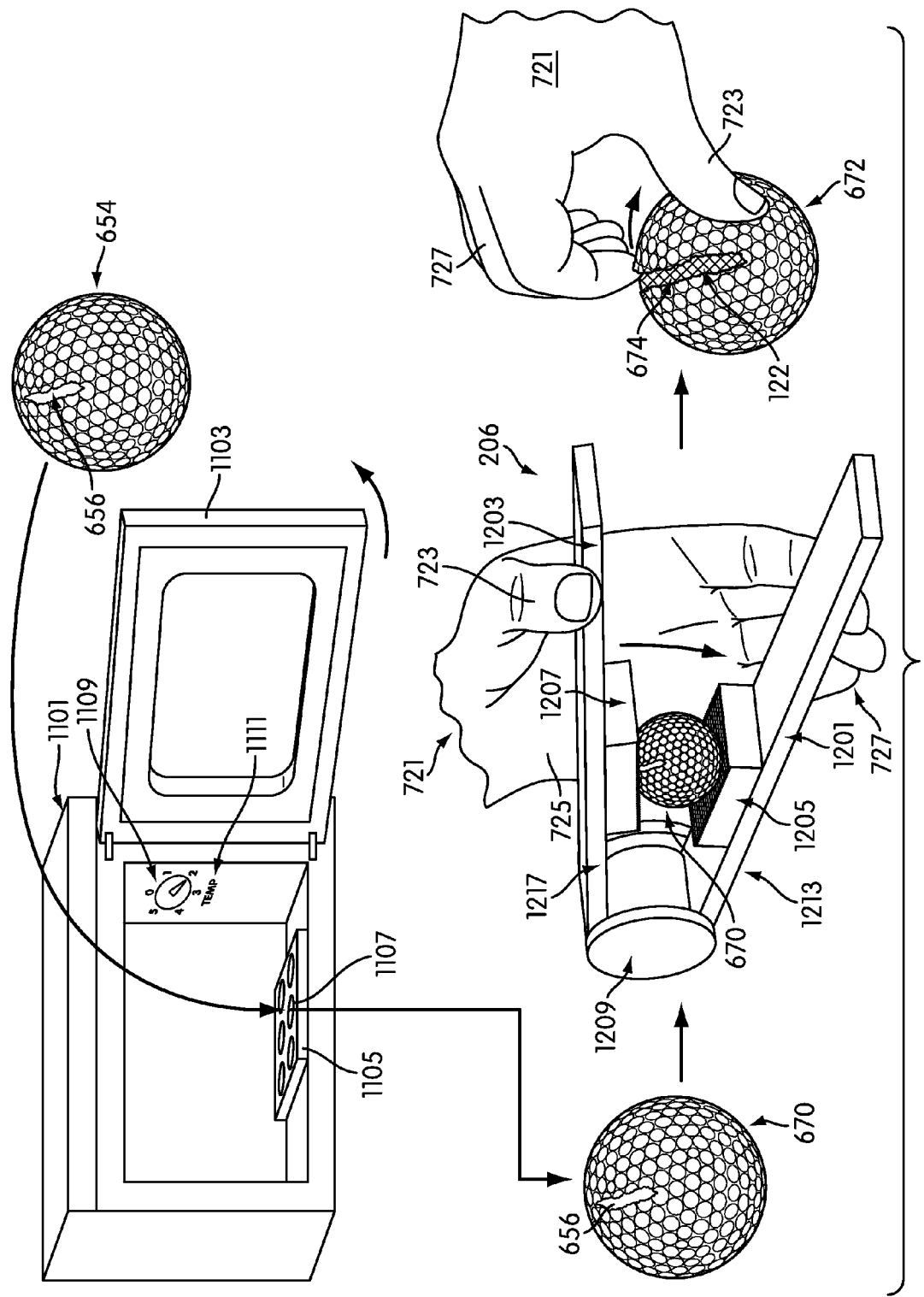
FIG. 11 shows a golf ball temperature control device, as used in a process of removing a cover layer from a worn golf ball

FIG. 11 shows yet another embodiment of a process for removing a cover layer from a finished golf ball. In this embodiment, finished worn golf ball 654 may first be subjected to environmental control. Specifically, golf ball 654 may be subjected to cold temperatures in a freezer 1101. Freezer 1101 may include door 1103, temperature control system 1109 having indicia 1111 to indicate the temperature level, and tray 1107 for holding one or more golf ball stationary. Freezer 1101 may be used to subject golf ball 654 to a temperature that is less than the glass transition temperature ($T_g$) of the material forming the cover layer on golf ball 654. As is generally known in the art of polymer materials, the glass transition temperature of a polymer is the temperature at which a polymer becomes stiffer due to decreased mobility of the polymer molecules. A polymer material that is subjected to temperatures below, or significantly below, its glass transition temperature will become stiffer and therefore brittle.

Therefore, golf ball 654 may be cooled in freezer 1101 to a temperature that is below the glass transition temperature of its cover layer material. In some embodiments, this temperature is greater than the glass transition temperature of the core in golf ball 654, in order to ensure that the core to be recycled does not become brittle. In particular embodiments, covers as included in any of the kits disclosed herein may be formed from a material having a specific glass transition temperature conducive to this method step. In particular, the glass transition temperature of a polymer material may be controlled through known methods in the polymer arts such as the amount of plasticizer and the presence or absence of large side-chains.

After cooling, cooled golf ball 670 may be subject to compressive pressure in order to "crack" open the cover layer. Specifically, a golfer may use a golf ball cover removal device 206 to apply compressive pressure to cooled golf ball 670.

Golf ball cover removal device 206 may include a first lever arm 1201 and a second lever arm 1203. First lever arm 1201 may be attached at first proximal end 1213 thereof to a pivot 1209 and may include a first golf ball gripping portion 1205 adjacent to pivot 1209. Similarly, second lever arm 1203 may be attached at a proximal end 1217 thereof to pivot 1209 and may include a second golf ball gripping portion 1207 adjacent to pivot 1209. First lever arm 1201 and second lever arm 1203 may be rotatable about pivot 1209 by the action of a human hand 721 such that first golf ball gripping portion 1205 and second golf ball gripping portion 1207 apply compressive pressure to a golf ball 670 located between therebetween when first lever arm 1201 and second lever arm 1203 are rotated towards each other.

The compressive pressure created by first golf ball gripping portion 1205 and second golf ball gripping portion 1207 on cooled golf ball 670 thereby may cause the cover layer on cooled golf ball 670 to crack open. As a result, large crack 674 forms on cracked golf ball 672, revealing core 122 therein. As shown in FIG. 11, in certain embodiments, the cover layer may then be fully removed by a golfer's hands 721.

Figure 12:
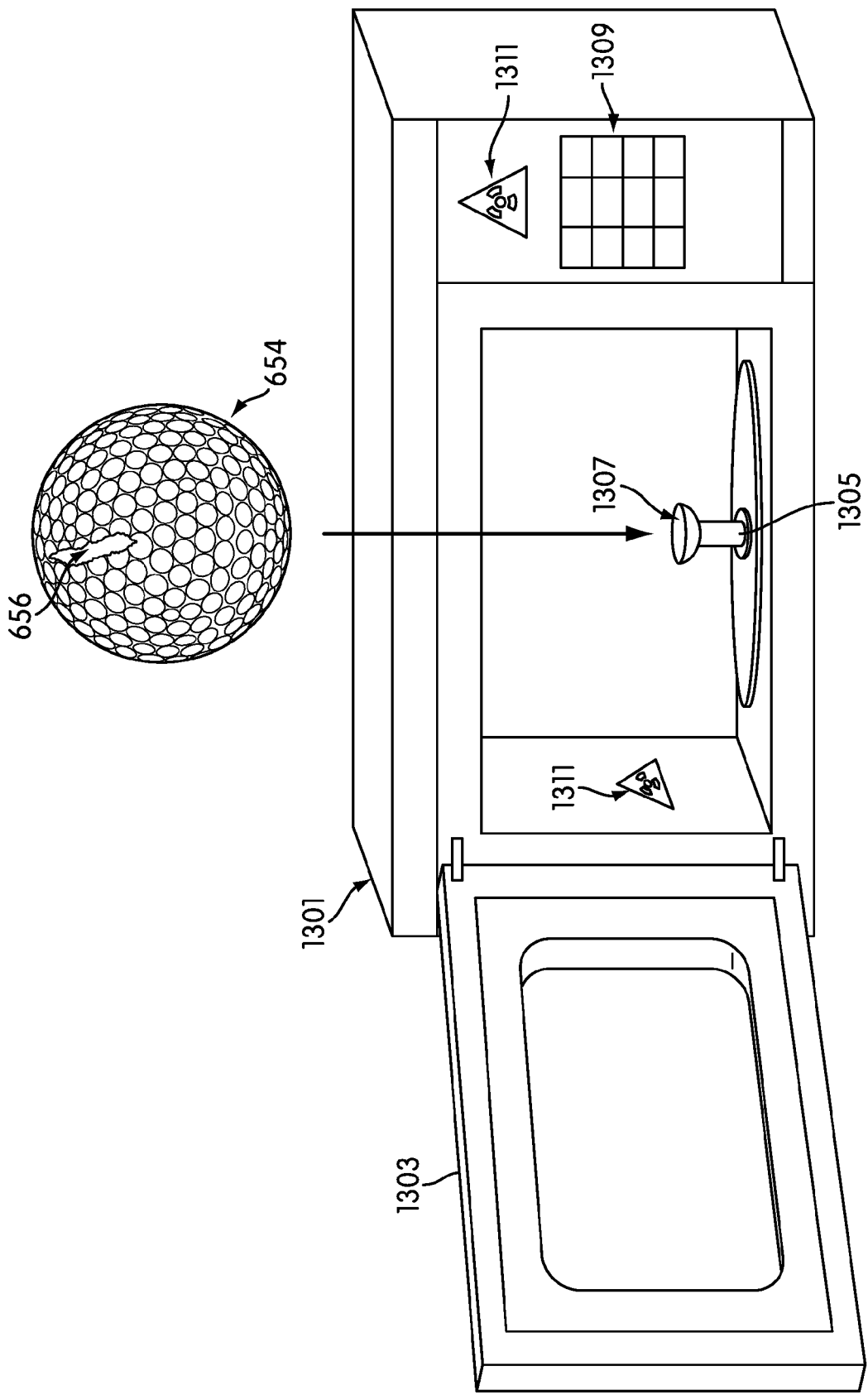
FIG. 12 shows a worn golf ball being put into an embodiment of a golf ball irradiation device.

FIG. 12 shows an alternative embodiment of an initial step in a process of removing a core from a finished golf ball by compressive pressure. Specifically, golf ball 654 may be subject to radiation in radiation chamber 1301. Radiation chamber 1301 may include door 1303, golf ball stand 1305 with golf ball holding portion 1307, controls 1309 and radiation indicia 1311. In particular embodiments, radiation chamber 1301 may irradiate golf ball 654 with ultra-violet (UV) radiation. As is known in the art of polymer materials, UV radiation may cause certain polymer materials to degrade so as to become brittle. Specifically, the susceptibility of a polymer material to UV induced brittleness may depend on factors such as the presence and amount of aromatic groups, the presence of catalyst residues, and the presence or absence of additives such as stabilizers and absorbers. Therefore, radiation chamber 1301 may be used to induce brittleness in the cover layer of a finished golf ball in embodiments where the cover layer material is either purposefully tailored to be (or inadvertently) susceptible to UV radiation. In some embodiments, covers as contained in any of the kits disclosed herein may be purposefully tailored to be susceptible to UV radiation.

Therefore, golf ball 654 may be subject to radiation in radiation chamber 1301 to induce brittleness, and then subject to compressive pressure to "crack" the cover layer as shown in FIG. 11 and discussed above.

In this way, a golfer may personally recycle a core from a finished golf ball by using a golf ball removal device, with or without environmental pre-conditioning.

Figure 13:
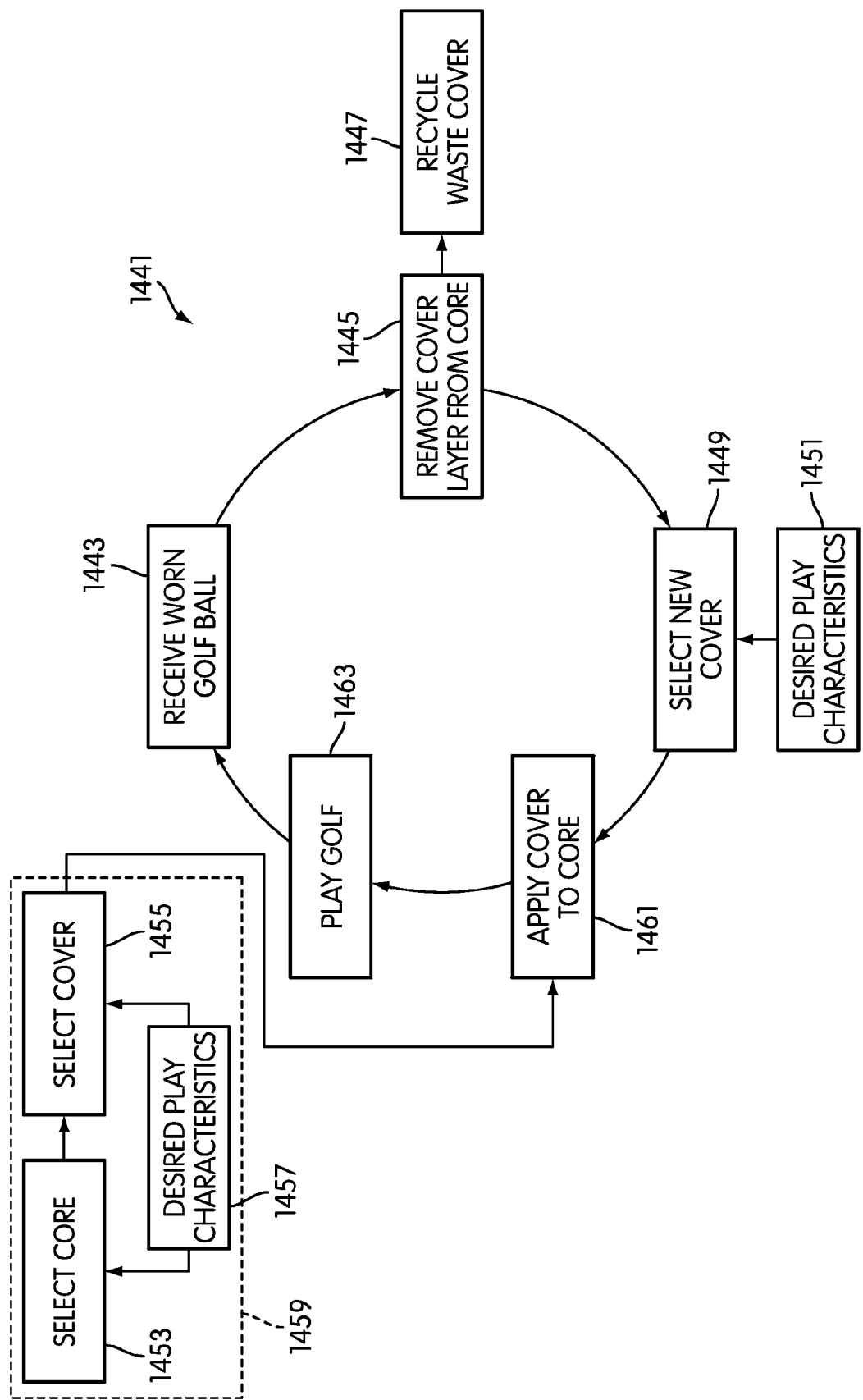
FIG. 13 shows a flowchart depicting a method of using a kit to customize and recycle a golf ball.

FIG. 13 shows a flowchart of the methods various discussed throughout this disclosure. Method 1441 includes a recycling loop, and therefore may be considered to not have a first step per se. However, a golfer may begin by purchasing a kit as described herein, as encompassed by step 1459. From the kit the golfer may select 1453 a core and select 1455 a cover based on desired play characteristics 1457. The golfer may then apply 1461 the cover to the core, such as by using a golf ball cover application device included in the kit, to create a finished golf ball. The golfer may then use the finished golf ball to play golf 1463. After playing golf a number of times, the golf ball becomes worn 1443.

The golfer may then remove the cover layer from the core, such as by using a golf ball cover removal device included in the kit. The golfer may optionally recycle the removed cover layer material. Recycling of the removed cover layer material may be particularly suitable in embodiments where the cover layer material is a thermoplastic. Such recycling may occur by, for example, setting up cover layer material recycling bins at golf pro shops, or other recycling collection methods.

The golfer may then select a new cover to be applied to the recycled core, based on one or more desired play characteristics. Finally, the golfer may again apply a selected cover to a core in order to create a finished golf ball.

From the perspective of a kit supplier, the method as shown in FIG. 13 may be described as: first providing a set of golf ball covers, then providing an indication to a user to select a golf ball cover out of the set of golf ball covers, and providing an indication to the user to apply the selected golf ball cover around a golf ball core so as to create a finished golf ball. In some embodiments, from the perspective a kit supplier, the method may also include steps of: providing a set of golf ball cores, providing an indication to the user to select a golf ball core out of the set of golf ball cores, and then providing an indication to the user to apply the selected golf ball cover around the selected golf ball core so as to create a finished golf ball. In alternative embodiments, the method from the perspective of a kit supplier may include steps of: providing an indication to the user to obtain a used finished golf ball, providing an indication to the user to remove the used cover layer from the used finished golf ball, so as to extract the used core from within the used finished golf ball, and providing an indication to the user to apply the selected golf ball cover around the used core so as to create a new finished golf ball.

The present method therefore allows a golfer to create customized golf balls, having desired play characteristics, and reduce the environmental impact the golfer would otherwise create due to continuously buying new golf balls.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A kit containing components for customizing and recycling a golf ball, the kit comprising:
   a core set, the core set including at least two golf ball cores, each of the at least two golf ball cores differing from each other with respect to at least one physical property;
   a cover set, the cover set including at least two golf ball covers, each of the at least two golf ball covers differing from each other with respect to at least one physical property;
   a golf ball cover removal device; and
   a golf ball cover application device;
   wherein each of the golf ball covers in the cover set and each of the golf ball cores in the core set are configured such that a finished golf ball is formed by applying a selected cover around a selected core using the golf ball cover application device; and
   wherein each of the golf ball covers in the cover set is a finished golf ball cover including dimples thereon.

2. The kit of claim 1, wherein the at least two cores in the core set have different compression values.

3. The kit of claim 2, wherein the compression values of the at least two cores in the core set having different compression values differ by at least about 5 units.

4. The kit of claim 1, wherein the core set includes at least a first core having a compression value of about 70, a second core having a compression value of about 80, a third core having a compression value of about 90, and a fourth core having a compression value of about 100.

5. The kit of claim 1, wherein the at least two covers in the set of golf ball covers have different hardness values.

6. The kit of claim 5, wherein the hardness values of the at least two covers in the cover set having different hardness values differ by at least about 5 units on the Shore D scale.

7. The kit of claim 1, wherein the cover set includes at least a first cover having a hardness value of about 40 Shore D, a second cover having a hardness value of about 50 Shore D, a third cover having a hardness value of about 60 Shore D, and a fourth cover having a hardness value of about 70 Shore D.

8. The kit of claim 1, wherein the golf ball cover removal device is configured to remove a golf ball cover from a golf ball through physical cutting of the golf ball cover.

9. The kit of claim 1, wherein the golf ball cover removal device is configured to remove a golf ball cover from a golf ball by applying compressive pressure to the golf ball.

10. The kit of claim 8, wherein the golf ball cover removal device comprises
    a first lever arm, the first lever arm being attached at a proximal end thereof to a pivot, and including a perimeter cutting edge at a distal end;

a second lever arm, the second lever arm being attached at a proximal end thereof to the pivot, and including a golf ball positioning portion at a distal end;

the first lever arm and the second lever arm being movable about the pivot by the action of a human hand;

wherein the perimeter cutting edge and the golf ball positioning portion are aligned so as to move toward and away from each other as the first lever arm and second lever arm move about the pivot, and wherein the perimeter cutting edge is configured to cut a golf ball cover around a perimeter of a golf ball.

11. The kit of claim 1, wherein the golf ball cover removal device comprises a first clamp arm, the first clamp arm including a first golf ball positioning portion at one end thereof and being rotatable about a longitudinal axis;

a second clamp arm, the second clamp arm including a crank at one end thereof and a second golf ball positioning portion at a second end;

the crank being rotatable by the action of a human hand such that rotation of the crank causes the second clamp arm to rotate about a longitudinal axis;

a cutting edge, the cutting edge being fixedly aligned with respect to the first clamp arm and the second clamp arm such that rotation of the first clamp arm and the second clamp arm causes a golf ball disposed between the first golf ball positioning portion and the second golf ball positioning portion to scrape against the cutting edge so as to remove a cover layer from the golf ball.

12. The kit of claim 1, wherein the golf ball cover removal device comprises a first lever arm, the first lever arm being attached at a proximal end thereof to a pivot and including a first golf ball gripping portion adjacent to the pivot;

a second lever arm, the second lever arm being attached at a proximal end thereof to the pivot and including a second golf ball gripping portion adjacent to the pivot;

the first lever arm and the second lever arm being rotatable about the pivot by the action of a human hand such that the first golf ball gripping portion and the second golf ball gripping portion apply compressive pressure to a golf ball located between the first golf ball gripping portion and the second golf ball gripping portion when the first lever arm and the second lever arm are rotated towards each other.

13. The kit of claim 1, wherein the golf ball cover application device comprises a heating device.

14. The kit of claim 13, wherein the golf ball cover application device comprises a heating mold, wherein the heating mold is configured to seal a golf ball cover around a golf ball core so as to produce a finished golf ball.

15. The kit of claim 1, wherein the golf ball cover application device comprises a first lever arm, the first lever arm having a first proximal end and a first distal end;

a second lever arm, the second lever arm having a second proximal end and a second distal end;

a pivot associated with both the first proximal end and the second proximal end;

a first golf ball receiving unit associated with the first distal end, the first golf ball receiving unit including a first internal heating surface;

a second golf ball receiving unit associated with the second distal end; the second golf ball receiving unit including a second internal heating surface; and wherein each of the first internal heating surface and the second internal heating surface includes a reverse dimple pattern thereon, the reverse dimple pattern on the internal heating surface having a total dimple volume that is the same as a total dimple volume of a total dimple volume of each golf ball cover in the cover set.

16. A kit containing components for customizing and recycling a golf ball, the kit comprising:

a core set, the core set including at least two golf ball cores, each of the at least two golf ball cores differing from each other with respect to at least one physical property;

a cover set, the cover set including at least two golf ball covers, each of the at least two golf ball covers differing from each other with respect to at least one physical property, wherein each of the golf ball covers in the cover set is a finished golf ball cover including dimples thereon;

a golf ball cover removal device; and a golf ball cover application device;

wherein each of the golf ball covers in the cover set and each of the golf ball cores in the core set are configured such that a finished golf ball is formed by applying a selected cover around a selected core using the golf ball cover application device;

wherein the golf ball cover application device comprises a first lever arm, having a first proximal end and a first distal end; a second lever arm, having a second proximal end and a second distal end; a pivot, attached to both the first proximal end and the second proximal end;

wherein the kit further comprises: a set of at least two pairs of golf ball cover heating mechanisms, each golf ball cover heating mechanism being configured to removably attach to the golf ball cover application device, and each pair of golf ball cover heating mechanisms having a different pattern on an internal surface thereof;

wherein each golf ball cover heating mechanism is removably attachable to at least one of the first distal end and the second distal end of the golf ball cover application device; each golf ball cover heating mechanism including a heating element; and each golf ball cover heating mechanism including a pattern on an internal heating surface thereof;

wherein at least one golf ball cover heating mechanism in each pair of golf ball cover heating mechanisms further comprises at least one structure on an internal heating surface thereof that is configured to orient a golf ball in a specific orientation when the golf ball is placed in the golf ball cover heating mechanism; and the at least one structure that is configured to orient a golf ball comprises a pin extending from an internal heating surface of the golf ball cover heating mechanism;

wherein the golf ball cover application device further comprises a latch mechanism, the latch mechanism having an engaged state and a disengaged state, and the latch mechanism being configured to hold the pair of golf ball cover heating mechanisms together when in the engaged state; and the latch mechanism is connected to an automatic release mechanism; the automatic release system comprising a temperature sensor, a controller and a trigger; the controller being programmed to initiate the trigger, so as to release the latch mechanism, based on an input from the temperature sensor; and wherein the a core set, the cover set, the golf ball cover removal device, and the golf ball cover application device are all packaged together in one package that is configured to be sold commercially to a golfer.

17. The kit of claim 16, wherein each pattern on the internal surface of each golf ball cover heating mechanism is a reverse dimple pattern, and each reverse dimple pattern has a total dimple volume that is the same as a total dimple volume of a total dimple volume of each finished golf ball cover in the cover set.

18. The kit of claim 1, wherein the a core set, the cover set, the golf ball cover removal device, and the golf ball cover application device are all contained together in one kit.

19. The kit of claim 1, wherein
the a core set, the cover set, the golf ball cover removal device, and the golf ball cover application device are all packaged together in one package.

20. The kit of claim 1, wherein
the a core set, the cover set, the golf ball cover removal device, and the golf ball cover application device are all packaged together in one package that is configured to be sold commercially to a golfer.

21. The kit of claim 1, wherein
each of the golf ball covers in the cover set includes a visual marking, such that each golf ball cover in the cover set is distinguishable from each other golf ball cover in the cover set.

22. The kit of claim 20, wherein the visual marking comprises an indicia.

23. The kit of claim 1, wherein the visual marking comprises writing.

\* \* \* \* \*